(12) United States Patent (10) Patent No.: US 10,922,600 B2
Watts et al. (45) Date of Patent: Feb. 16, 2021

(54) CARD GRAB TAB METHOD AND DEVICES

(71) Applicants: Lisa Sickler Watts, Pasadena, CA (US); Renee Hubbard, Pasadena, CA (US)

(72) Inventors: Lisa Sickler Watts, Pasadena, CA (US); Renee Hubbard, Pasadena, CA (US)

(*) Notice: Subject to any disclaimer, the term of this patent is extended or adjusted under 35 U.S.C. 154(b) by 0 days.

(21) Appl. No.: 16/223,128

(22) Filed: Dec. 18, 2018

(65) Prior Publication Data

US 2020/0193257 A1 Jun. 18, 2020

(51) Int. Cl.
*G06K 19/077* (2006.01)
*A45C 11/18* (2006.01)

(52) U.S. Cl.
CPC ...... *G06K 19/07703* (2013.01); *A45C 11/182* (2013.01); *G06K 19/07741* (2013.01)

(58) Field of Classification Search
CPC ........ G06K 19/07703; G06K 19/07741; A45C 11/182
USPC .......................................................... 235/492
See application file for complete search history.

(56) References Cited

U.S. PATENT DOCUMENTS

| 3,172,687 | A  | * | 3/1965  | Lawrence | B42D 3/12 281/31 |
| 5,826,786 | A  | * | 10/1998 | Dickert  | A47G 23/0216 229/403 |
| 8,035,017 | B1 | * | 10/2011 | Morris   | G10D 3/173 84/320 |
| 2003/0026460 | A1 | * | 2/2003 | Conrad | G06T 7/507 382/114 |
| 2008/0295351 | A1 | * | 12/2008 | Borozny | B65C 9/262 33/613 |

* cited by examiner

*Primary Examiner* — Michael G Lee
*Assistant Examiner* — David Tardif
(74) *Attorney, Agent, or Firm* — Edmond DeFrank

(57) ABSTRACT

The embodiments disclose an apparatus including a card grab tab for adhering to an object including a credit card to facilitate gripping by a thumb and fingers, an adhesive area for adhering the card grab tab to an object including a credit card, and an embossed feature applied to the card grab tab shape for identification and a tactile grip and identification.

20 Claims, 26 Drawing Sheets

CARD GRAB TAB METHOD AND DEVICES

BACKGROUND

A style for some time has been having long nails on the fingers of your hands. While generally considered very stylish it also poses difficulties for the person with the long nails. The extended nails make it difficult to pick up items. The advent of credit cards, debit cards, a variety of plastic cards for identification and security purposes has only amplified the credit card occasions which arise in which long nails make gripping the cards more difficult.

DETAILED DESCRIPTION OF THE INVENTION

In a following description, reference is made to the ID grab tab method and devices drawings, which form a part hereof, and in which is shown by way of illustration a specific example in which the invention may be practiced. It is to be understood that other embodiments may be utilized and structural changes may be made without departing from the scope of the embodiments.

General Overview:

It should be noted that the descriptions that follow, for example, in terms of a card or identification ("ID") grab tab method and devices is described for illustrative purposes and the underlying system can apply to any number and multiple types user selected articles including documents, envelopes, index cards, credit cards, debit cards and a variety of plastic cards for identification and security purposes and other objects. In one embodiment of the present invention, the card or ID grab tab method and devices can be configured using a flexible plastic. The card or ID grab tabs can be configured to include artistic and abstract features and can be configured to include functions in addition to assisting gripping of objects of any type using the embodiments.

The term and phrase "credit card" in singular or plural shall additional refer to "credit cards", "debit cards" and a variety of "plastic cards" including "identification cards" and security ID cards and other cards used for other purposes. The ID grab tab method and devices as described herein shall also include applications for other objects upon which to apply the ID grab tab for which a user finds a benefit. For example some elderly persons may experience a loss of manual dexterity due to arthritis or other ailments and may find applying an ID grab tab to a paper prescription or other object makes picking the article up more manageable.

Figure 1A:
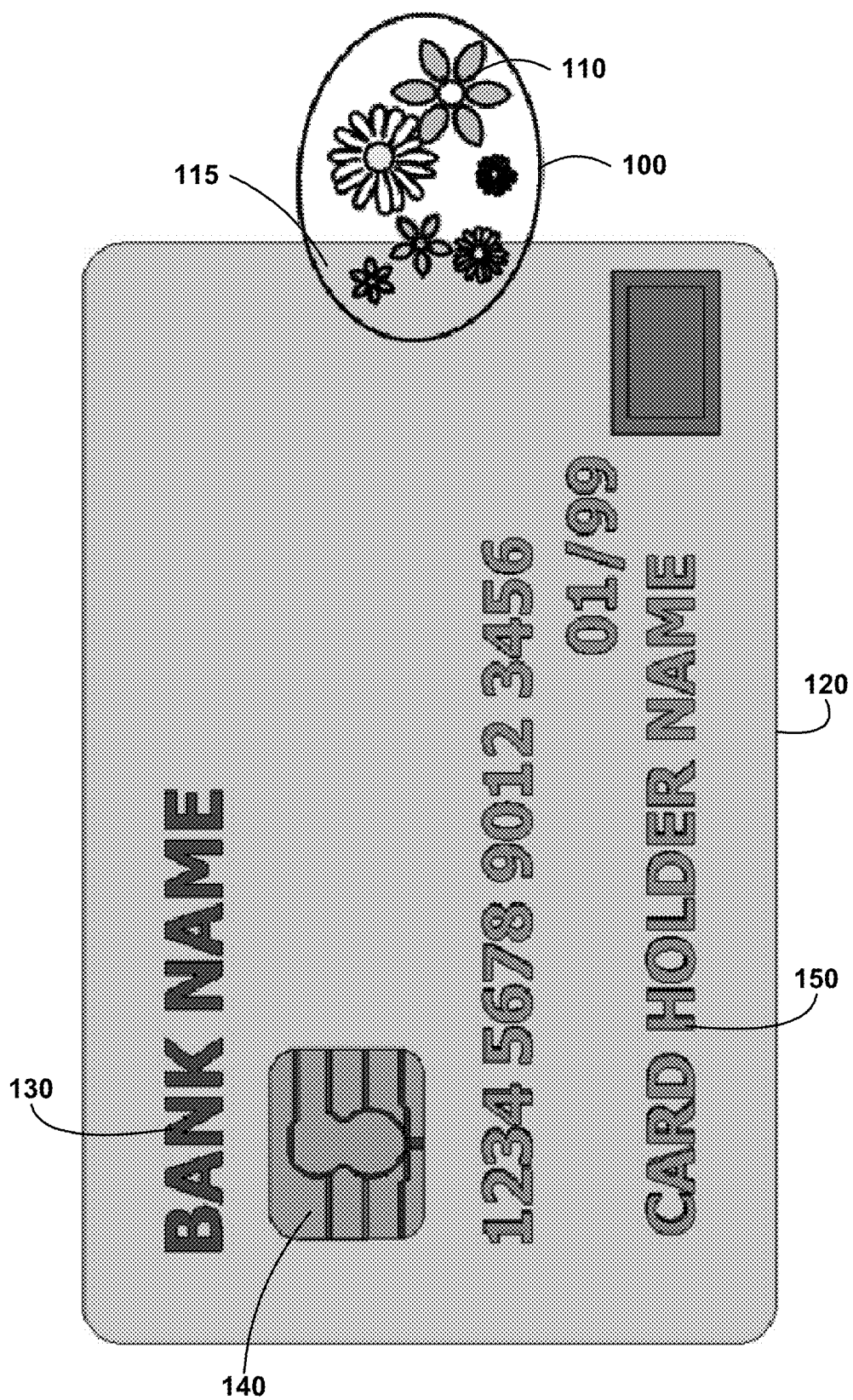
FIG. 1A shows for illustrative purposes only an example of a credit card with a tab attached of one embodiment.

FIG. 1A shows for illustrative purposes only an example of a credit card with a tab attached of one embodiment. FIG. 1A shows an ID grab tab 100 embodied as an oval tab with embossed flower feature 110 a proximal end. FIG. 1A shows the ID grab tab 100 adhered on a credit card face 115. The face of the credit card 120 shows a bank name 130, chip 140 and raised lettering 150 of the card number, card holder name and expiration date of one embodiment.

Figure 1B:
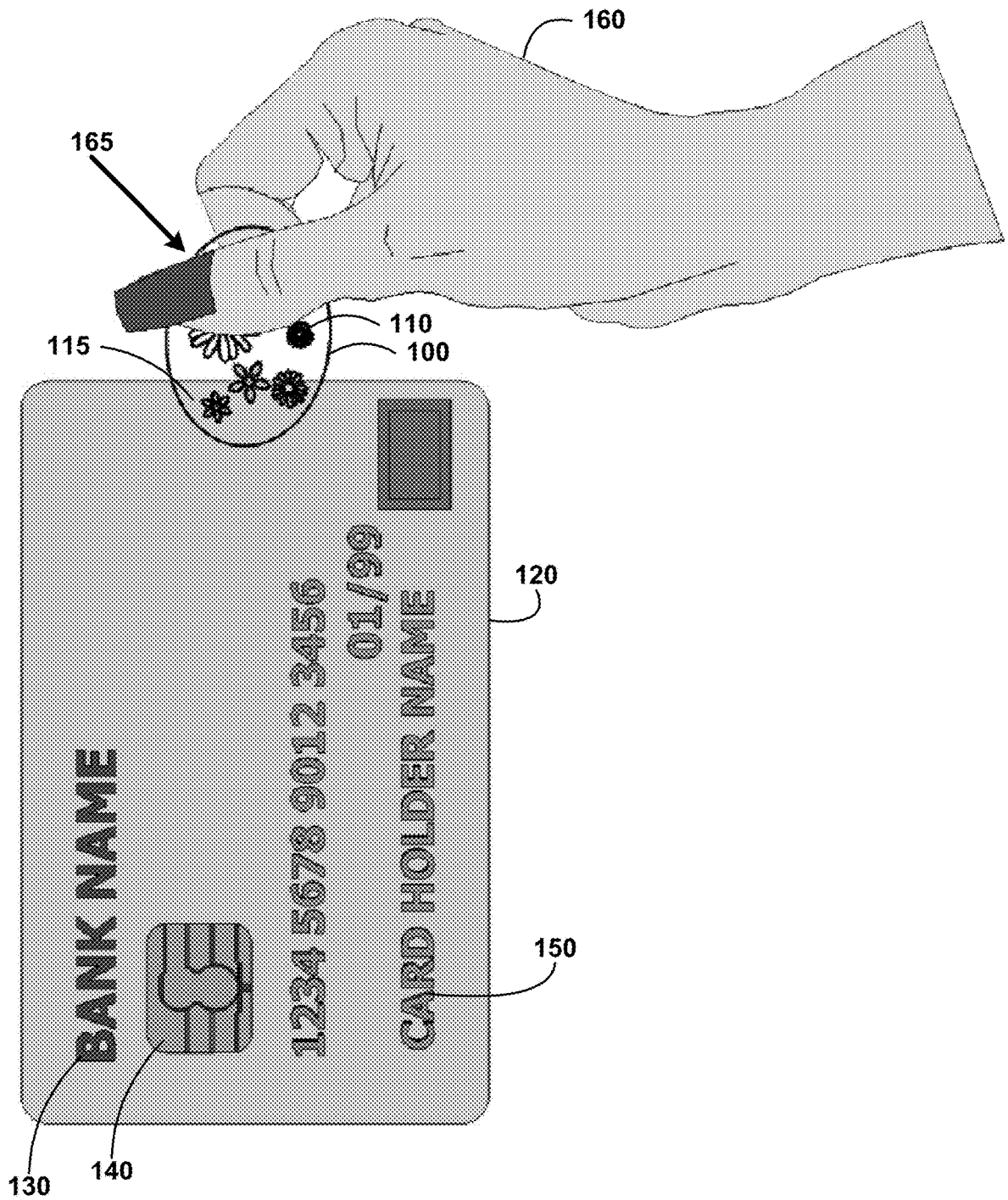
FIG. 1B shows for illustrative purposes only an example of a hand with long nails pulling an ID grab tab coupled to a credit card of one embodiment.

Detailed Description:

FIG. 1B shows for illustrative purposes only an example of a hand with long nails pulling a card or an ID grab tab coupled to a credit card of one embodiment. FIG. 1B shows the card or ID grab tab 100 on the distal end adhered on a credit card face 115. The bank name 130, chip 140 and raised lettering 150 can be seen on the credit card face. The oval tab with embossed flower feature 110 extends beyond the edge of the credit card 120. A person with long nails may experience difficulty in picking up or lifting the credit card 120 from for example a wallet card holder and any flat surface. Showing is a hand with long nails 160 with the thumb and fingers gripping the card or ID grab tab 165. The extended flexible card or ID grab tab 100 makes it easier for the hand with long nails 160 to pinch the card or ID grab tab 100 for lifting and handling the credit card 120 without the nails interfering of one embodiment.

Figure 2:
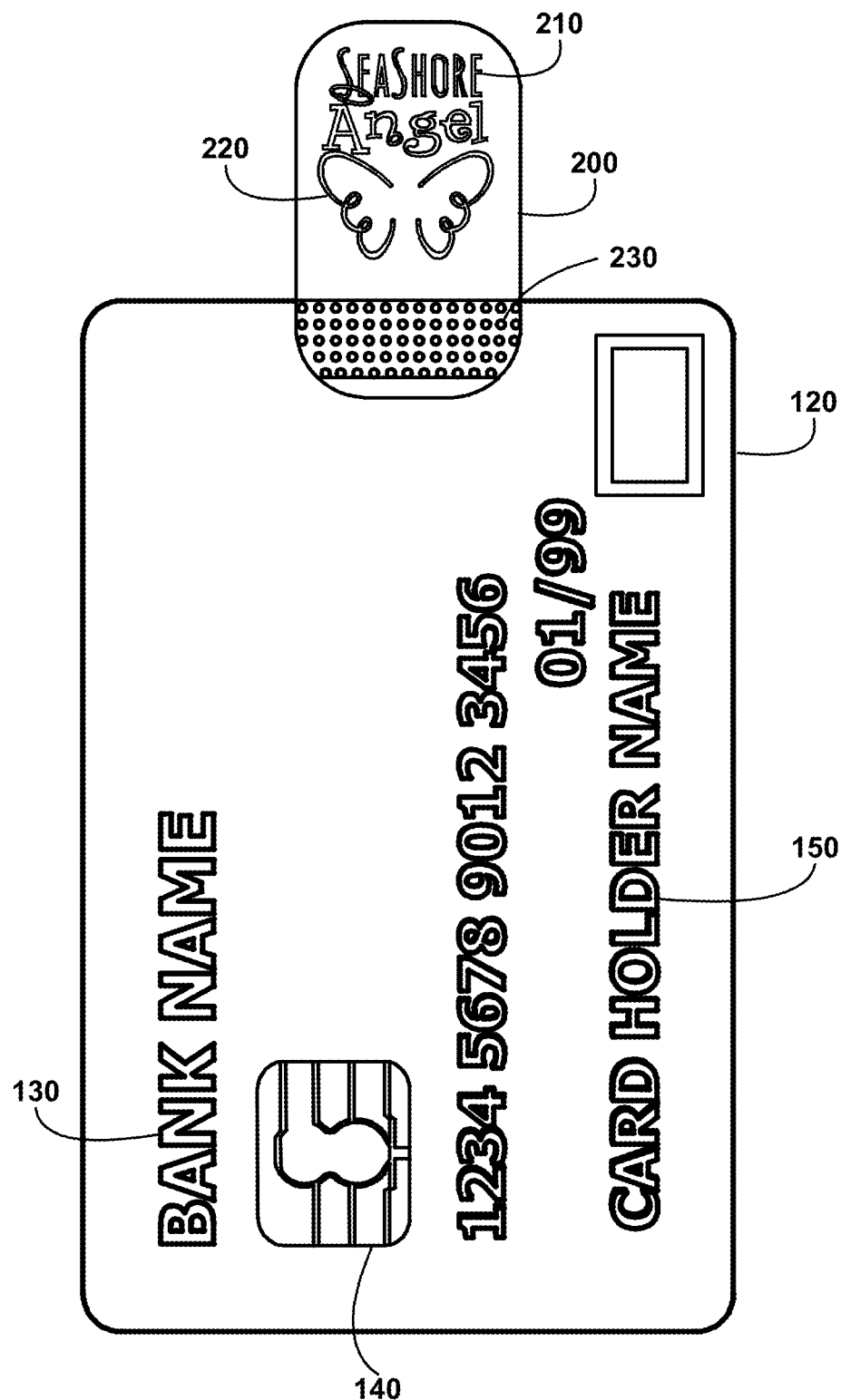
FIG. 2 shows for illustrative purposes only an example of sea shore angel tab on a credit card face of one embodiment.

Sea Shore Angel Tab on a Credit Card Face:

FIG. 2 shows for illustrative purposes only an example of sea shore angel tab on a credit card face of one embodiment. FIG. 2 shows the credit card 120 with the bank name 130, chip 140 and raised lettering 150. Attached to the credit card 120 in this example is a rectangular seashore angel feature ID grab tab 200. The rectangular seashore angel feature ID grab tab 200 includes filleted corners, embossed tab text 210, an embossed butterfly feature 220 and an adhesive area 230 used for attaching to the face of the credit card 120 of one embodiment.

Figure 3:
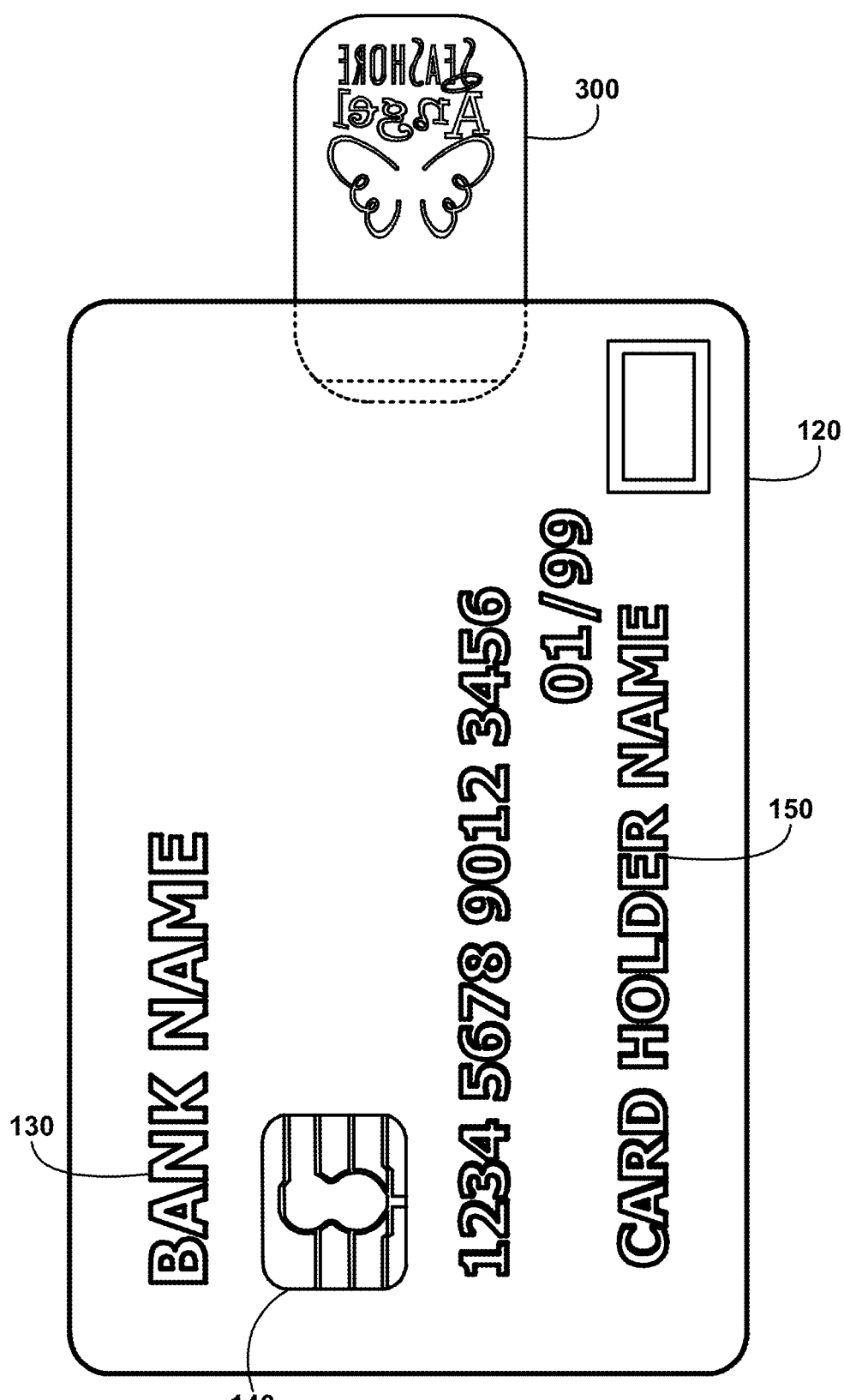
FIG. 3 shows for illustrative purposes only an example of sea shore angel tab on a credit card back side face view of one embodiment.

Sea Shore Angel Tab on a Credit Card Back Side Face View:

FIG. 3 shows for illustrative purposes only an example of sea shore angel tab on a credit card back side face view of one embodiment. FIG. 3 shows the face of the credit card 120 with the bank name 130, chip 140 and raised lettering 150 protruding from the face surface. Also showing is a back view of transparent rectangular seashore angel feature ID grab tab 300 adhered to the back side of the credit card 120. The adhesive area 230 of FIG. 2 positioned on the back side can be seen in dashed lines of one embodiment.

Figure 4:
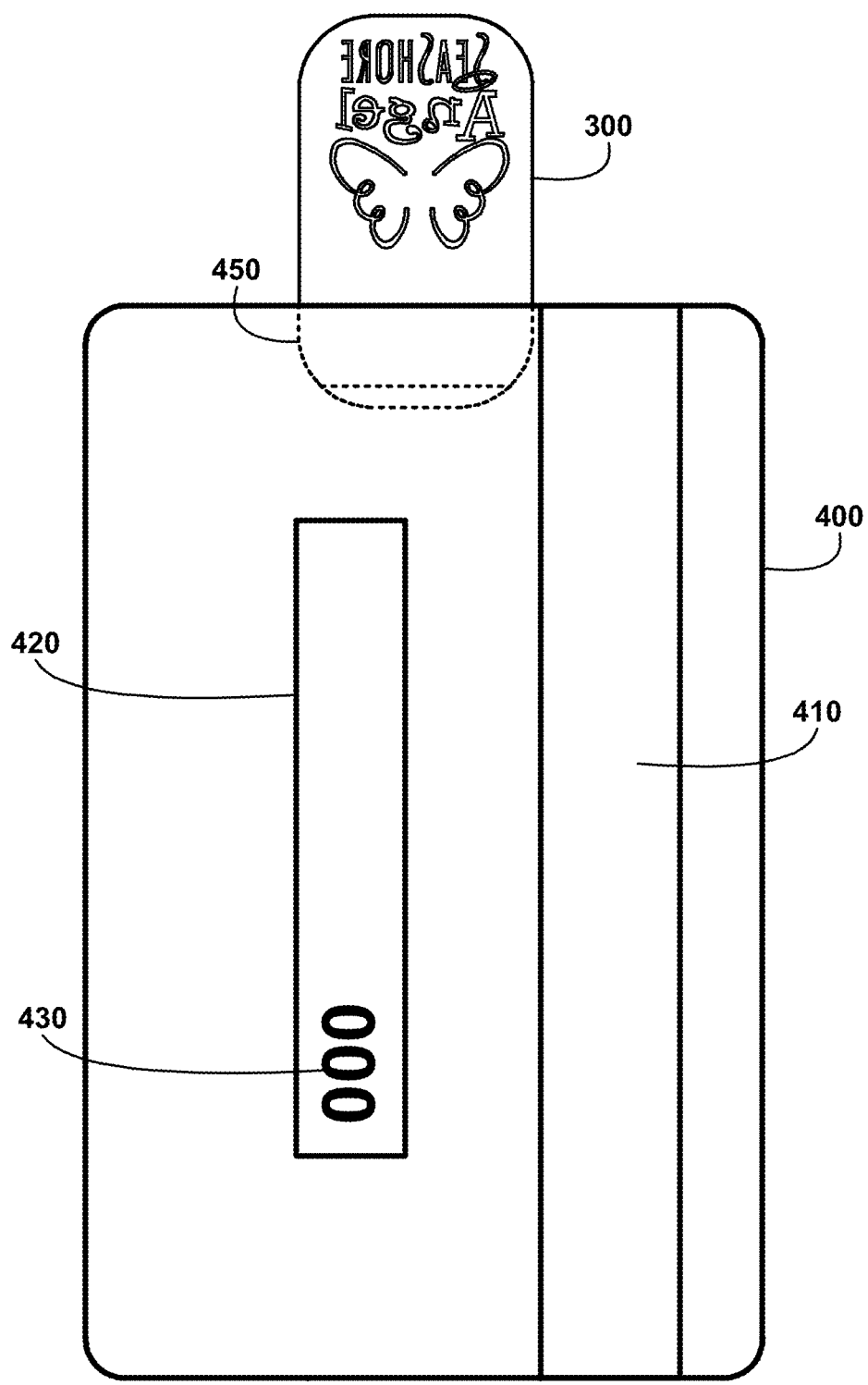
FIG. 4 shows for illustrative purposes only an example of sea shore angel tab on a credit card face back view of one embodiment.

Sea Shore Angel Tab on a Credit Card Face Back View:

FIG. 4 shows for illustrative purposes only an example of sea shore angel tab on a credit card face back view of one embodiment. FIG. 4 shows a credit card back side view 400 and providing a view of a magnetic strip 410, signature strip 420 and Card Verification Code (CVC) code 430. The credit card face adhered ID grab tab 100 of FIG. 1 is seen in a back view of the transparent rectangular seashore angel feature ID grab tab 300 and adhesive area front face position 450 with dashed lines of one embodiment.

Figure 5:
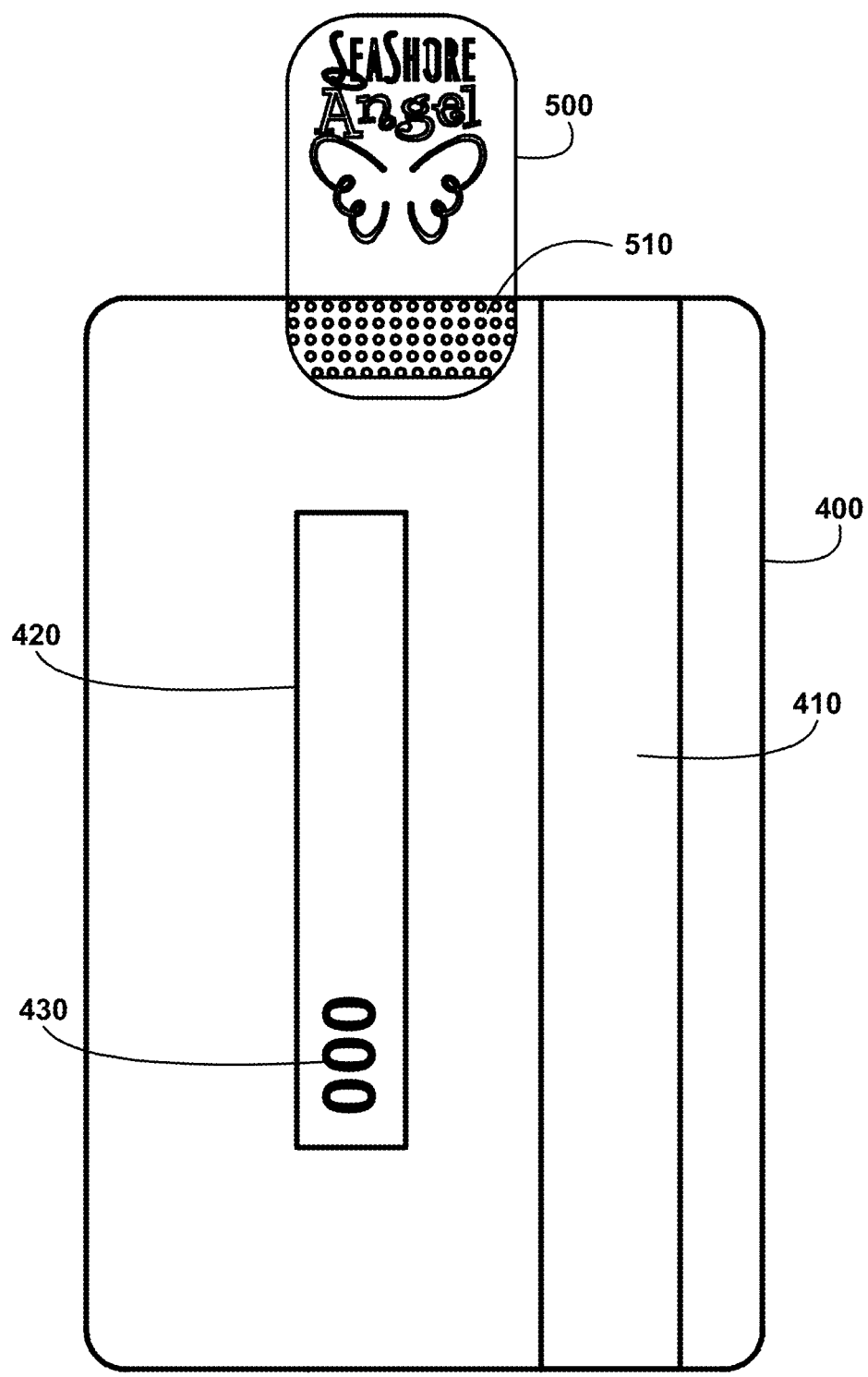
FIG. 5 shows for illustrative purposes only an example of sea shore angel tab on a credit card back side back view of one embodiment.

Sea Shore Angel Tab on a Credit Card Back Side Back View:

FIG. 5 shows for illustrative purposes only an example of sea shore angel tab on a credit card back side back view of one embodiment. FIG. 5 shows the credit card back side view 400 and magnetic strip 410, signature strip 420 and CVC code 430. In this example it is shows an adhesive area applied on card back side 510. A card back side application of the rectangular seashore angel feature ID grab tab 500 shows the face side of the tab of one embodiment.

Figure 6:
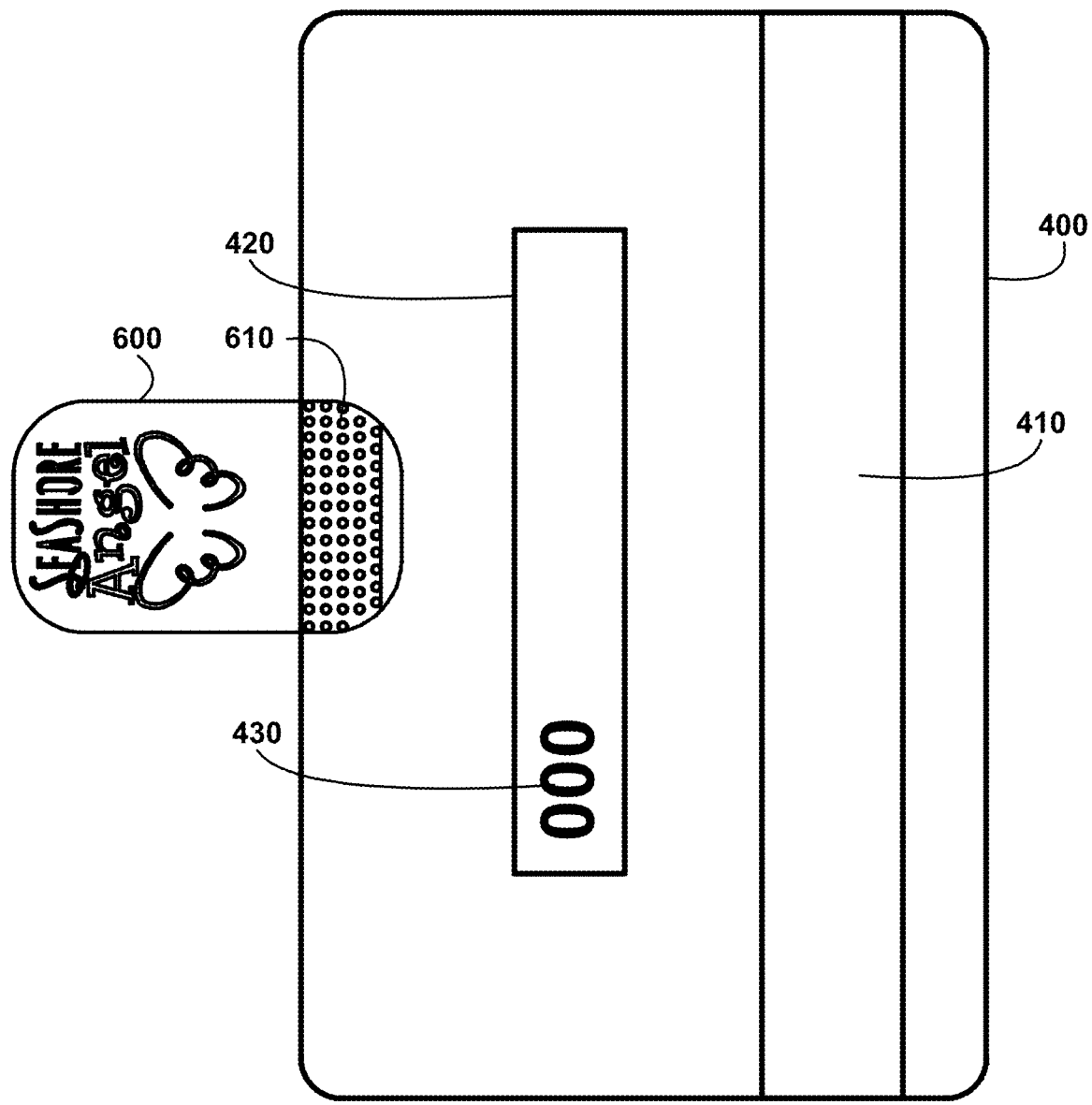
FIG. 6 shows for illustrative purposes only an example of sea shore angel tab on a credit card back side edge back view of one embodiment.

Sea Shore Angel Tab on a Credit Card Back Side Edge Back View:

FIG. 6 shows for illustrative purposes only an example of sea shore angel tab on a credit card back side edge back view of one embodiment. FIG. 6 shows the credit card back side view 400, magnetic strip 410, signature strip 420 and CVC code 430. A credit card side edge application of rectangular seashore angel feature ID grab tab 600 includes an adhesive area adhered on a card side edge 610 of one embodiment.

Figure 7:
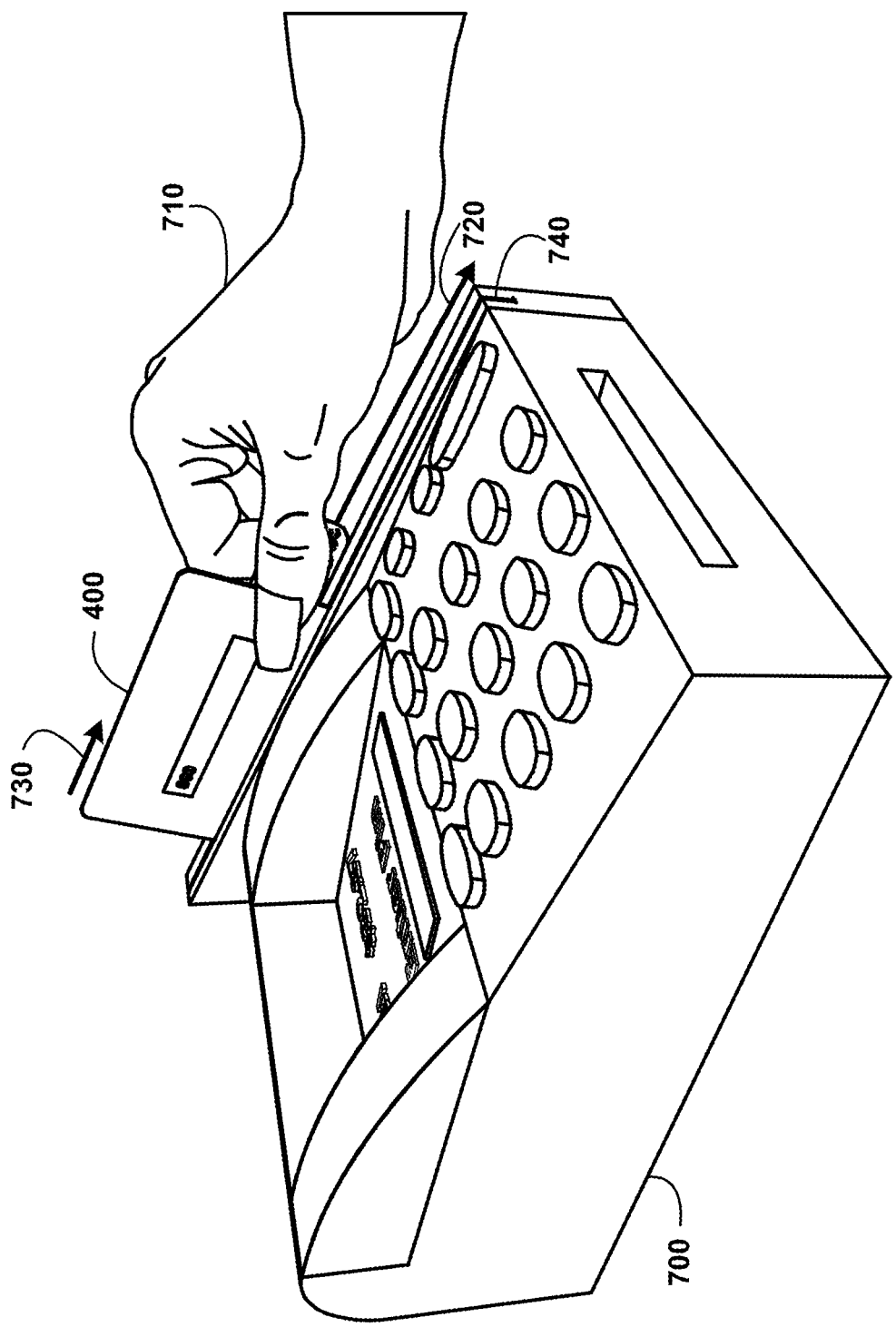
FIG. 7 shows for illustrative purposes only an example of hand with long nails holding tab and sliding in card reader of one embodiment.

Hand with Long Nails Holding Tab and Sliding in Card Reader:

FIG. 7 shows for illustrative purposes only an example of hand with long nails holding tab and sliding in card reader of one embodiment. FIG. 7 shows a Point Of Sale (POS) situation familiar to almost everyone. A buyer of a product is required to process a credit card purchase with a credit card POS reader 700. In some instances the buyer may need to slide their credit card in the credit card POS reader 700 by sliding the credit card in a card slide slot 740. FIG. 7 shows a hand with long nails gripping the ID grab tab 710 and pulling on the ID grab tab to slide it through the card POS reader slide slot 720. The credit card back side view 400 shows the credit card being slid thru the POS card reader 730 of one embodiment.

Figure 8:
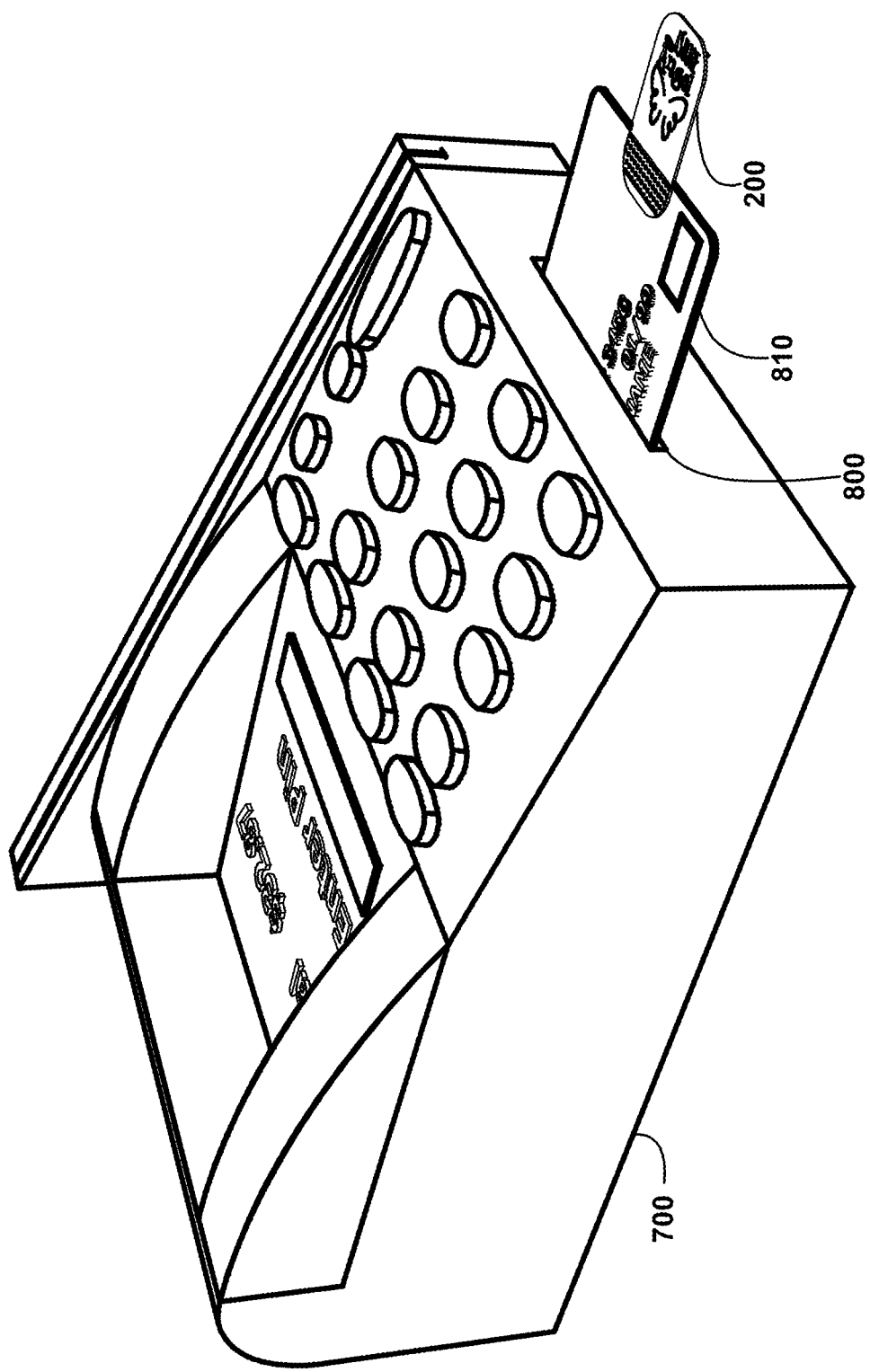
FIG. 8 shows for illustrative purposes only an example of credit card with tab inserting chip of one embodiment.

Credit Card with Tab Inserting Chip:

FIG. 8 shows for illustrative purposes only an example of credit card with tab inserting chip of one embodiment. FIG. 8 shows the credit card POS reader 700 with a credit card with chip inserted 810 with the rectangular seashore angel feature ID grab tab 200 extending outward from a credit card chip reader slot 800 of one embodiment.

Figure 9:
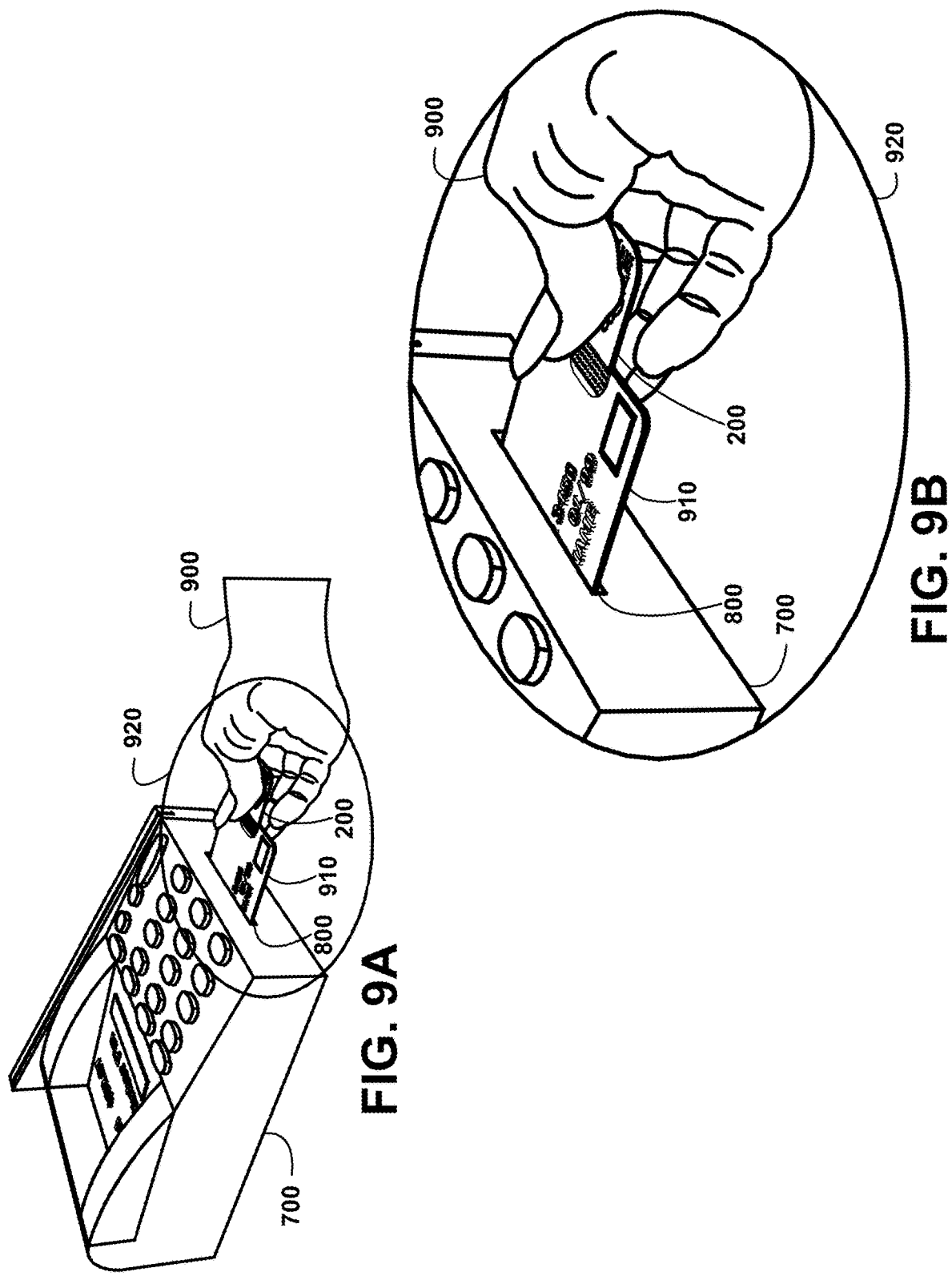
FIG. 9A shows for illustrative purposes only an example of hand with long nails holding tab inserting card chip of one embodiment.
FIG. 9B shows for illustrative purposes only an example of hand with long nails holding tab inserting card chip close up of one embodiment.

Hand with Long Nails Holding Tab Inserting Card Chip:

FIG. 9A shows for illustrative purposes only an example of hand with long nails holding tab inserting card chip of one embodiment. FIG. 9A shows the credit card POS reader 700 with the credit card chip reader slot 800. A hand with long nails pushing and pulling a credit card in and out of chip reader 900. The rectangular seashore angel feature ID grab tab 200 is extended outside of a credit card in chip reader slot 910 while inserting making it easier for a user to maintain their grip and accessibility of one embodiment. A detail area indicator 920 shows an area to be seen in a close up in FIG. 9B.

Hand with Long Nails Holding Tab Inserting Card Chip Close Up:

FIG. 9B shows for illustrative purposes only an example of hand with long nails holding tab inserting card chip close up of one embodiment. FIG. 9B shows the detail area indicator 920 close up of the credit card POS reader 700 and credit card chip reader slot 800. Also showing is the hand with long nails pushing and pulling credit card in and out of chip reader 900, credit card in chip reader slot 910 and credit card rectangular seashore angel feature tab 200 of one embodiment.

Figure 10:
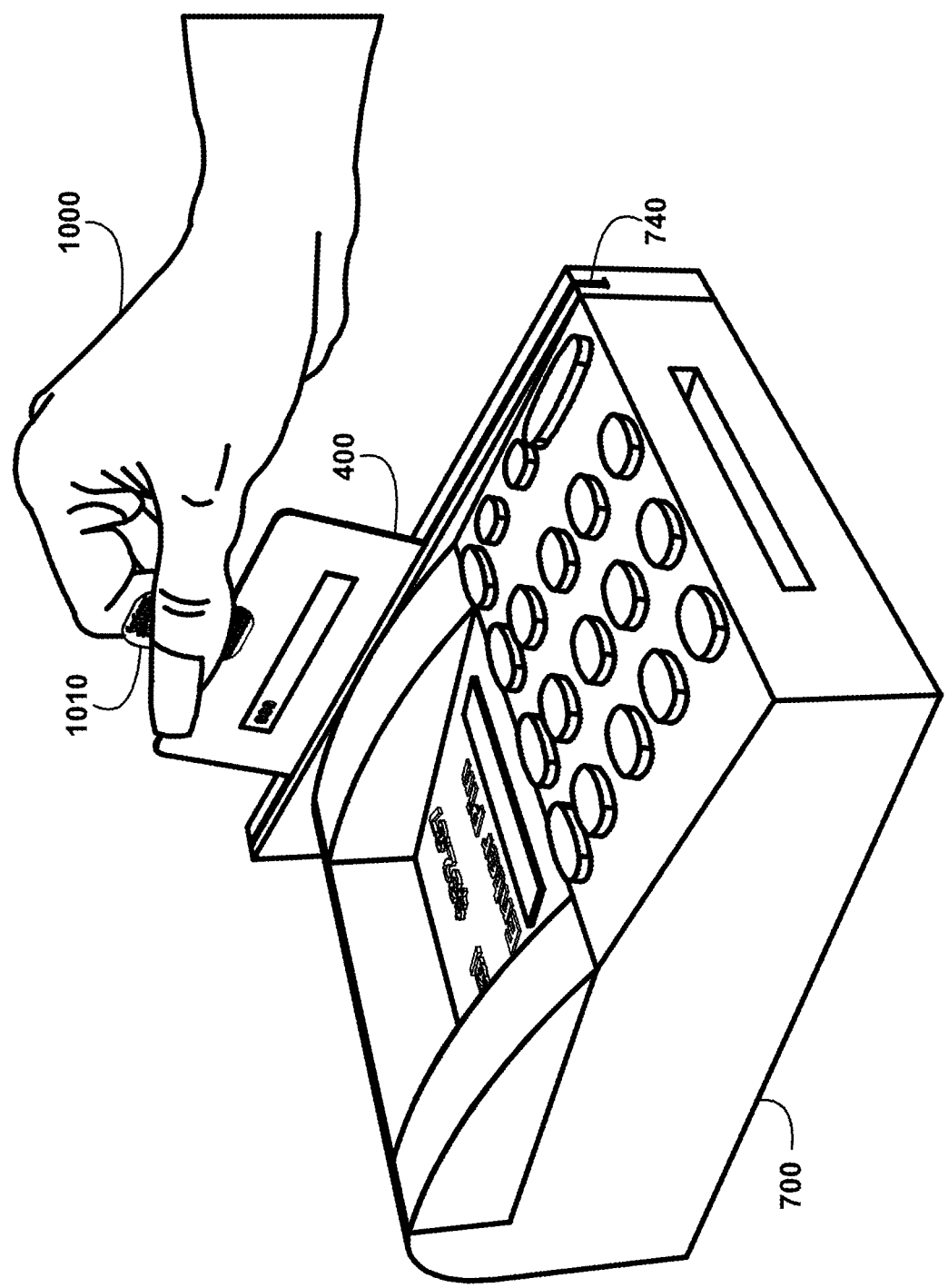
FIG. 10 shows for illustrative purposes only an example of hand with long nails holding side coupled tab and sliding in card reader of one embodiment.

Hand with Long Nails Holding Side Coupled Tab and Sliding in Card Reader:

FIG. 10 shows for illustrative purposes only an example of hand with long nails holding side coupled tab and sliding in card reader of one embodiment. FIG. 10 shows the credit card POS reader 700, card slide slot 740 and credit card back side view 400. Shown is a card side edge applied credit card tab 1010 and a hand with long nails gripping card side edge applied credit card tab 1000 of one embodiment.

Figure 11:
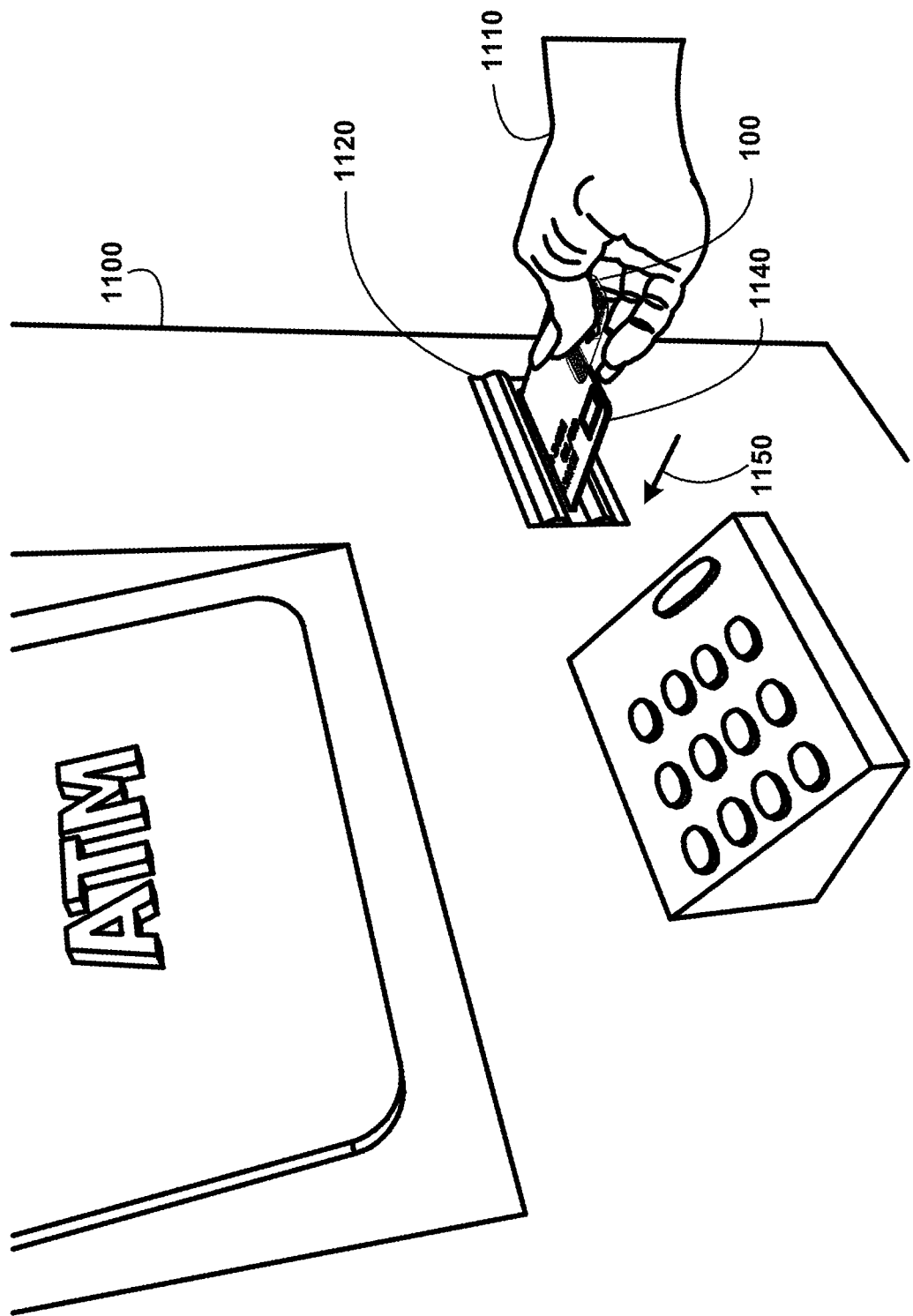
FIG. 11 shows for illustrative purposes only an example of hand with long nails holding tab and sliding into an ATM of one embodiment.

Hand with Long Nails Holding Tab and Sliding into an ATM:

FIG. 11 shows for illustrative purposes only an example of hand with long nails holding tab and sliding into an ATM of one embodiment. FIG. 11 shows an ATM 1100 with an ATM partial insertion card reader 1120. The hand with long nails gripping ID grab tab 710 is holding the ID grab tab 100 and performing a credit card partial insertion 1140 where with the hand pushing in the credit card 1150 of one embodiment.

Figure 12:
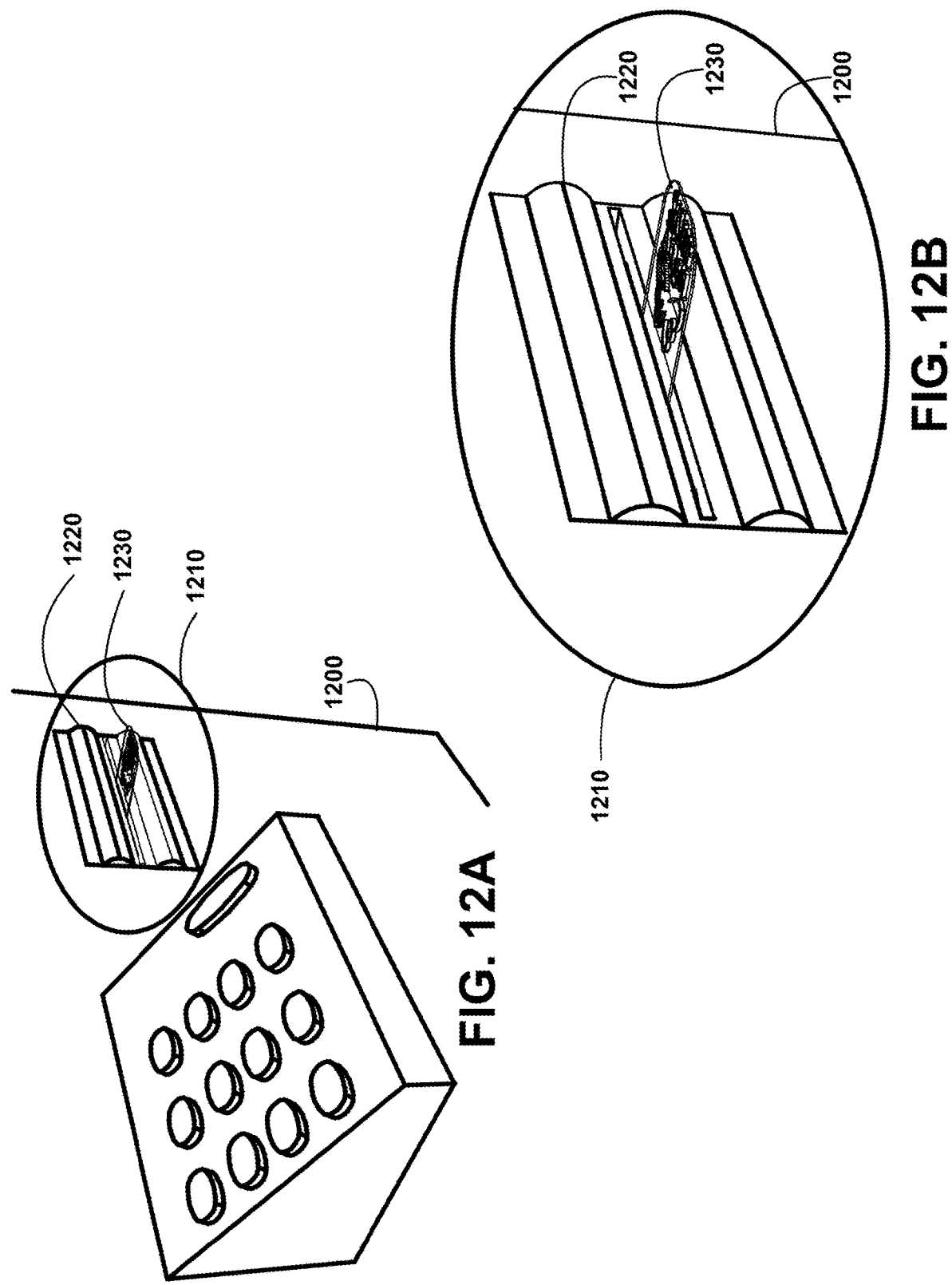
FIG. 12A shows for illustrative purposes only an example of credit card with tab inserted in an ATM of one embodiment.
FIG. 12B shows for illustrative purposes only an example of credit card with tab inserted in an ATM close up of one embodiment.

Credit Card with Tab Inserted in an ATM:

FIG. 12A shows for illustrative purposes only an example of credit card with tab inserted in an ATM of one embodiment. FIG. 12A shows an ATM with full credit card insertion 1200 with a full credit card insertion reader 1220. The credit card 120 of FIG. 1 has been fully pulled into the full credit card insertion reader 1220 by the ATM. The ID grab tab extended outside of full credit card insertion reader 1230 can be seen and easily griped and keep accessible to the user of one embodiment. A close up area indicator 1210 shows the area described in FIG. 12B.

Credit Card with Tab Inserted in an ATM Close Up:

FIG. 12B shows for illustrative purposes only an example of credit card with tab inserted in an ATM close up of one embodiment. FIG. 12B shows the close up area indicator 1210 with a closer view of an ATM with full credit card insertion 1200 and full credit card insertion reader 1220. The ID grab tab extended outside of full credit card insertion reader 1230 is shown with nearly the entire ID grab tab 100 of FIG. 1 exposed outside of the full credit card insertion reader 1220 and easily able to be griped by a hand with long nails of one embodiment.

Figure 13:
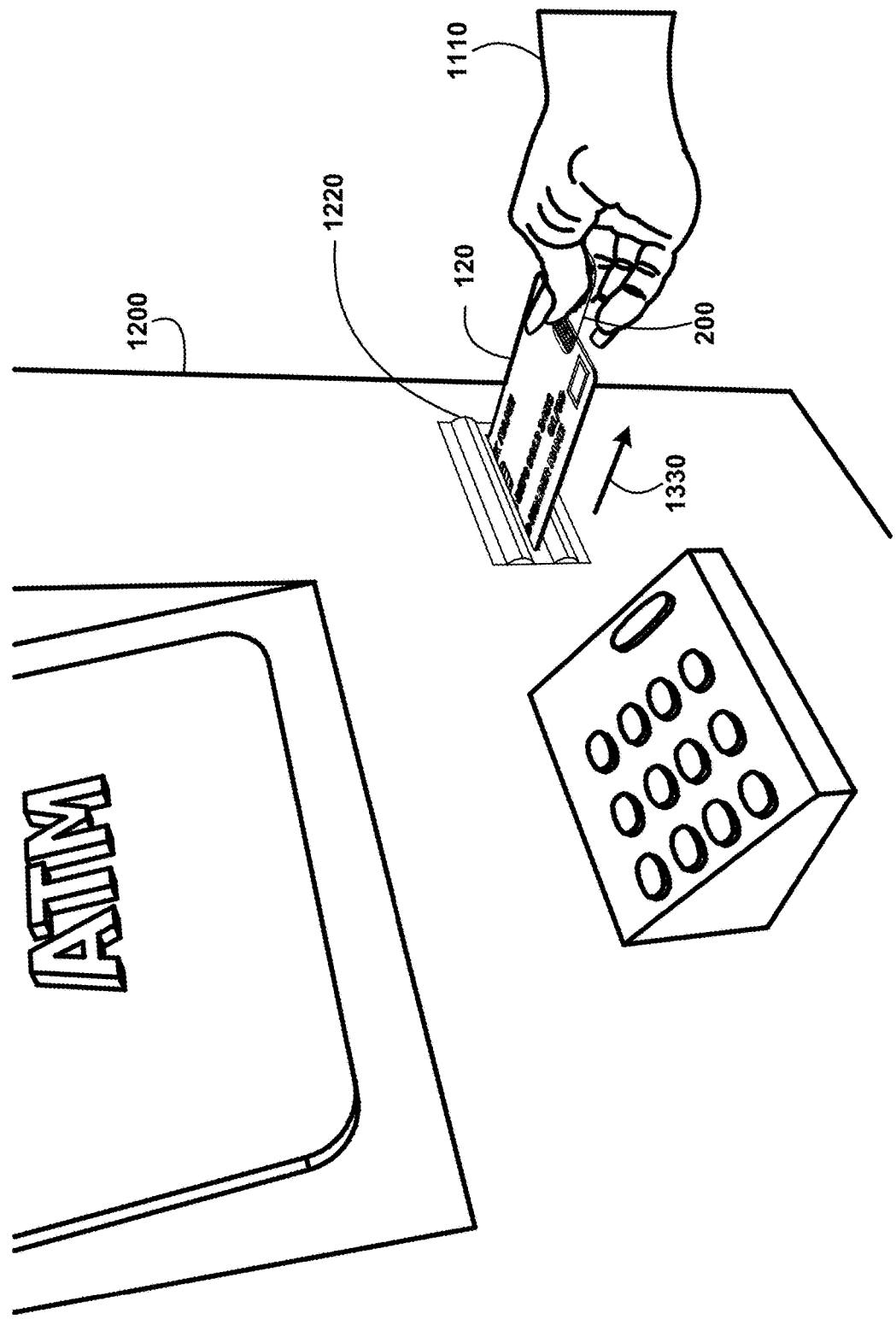
FIG. 13 shows for illustrative purposes only an example of hand with long nails holding tab and pulling out of an ATM of one embodiment.

Hand with Long Nails Holding Tab and Pulling Out of an ATM:

FIG. 13 shows for illustrative purposes only an example of hand with long nails holding tab and pulling out of an ATM of one embodiment. FIG. 13 shows the ATM with full credit card insertion 1200 and full credit card insertion reader 1220. Also showing is a portion of the credit card 120 with the adhered ID grab tab 100. The hand with long nails gripping ID grab tab 710 is also seen able to easily grip the adhered ID grab tab 100. FIG. 13 shows a hand with long nails gripping ID grab tab and pulling out the fully inserted credit card 1330 of one embodiment.

Figure 14A:
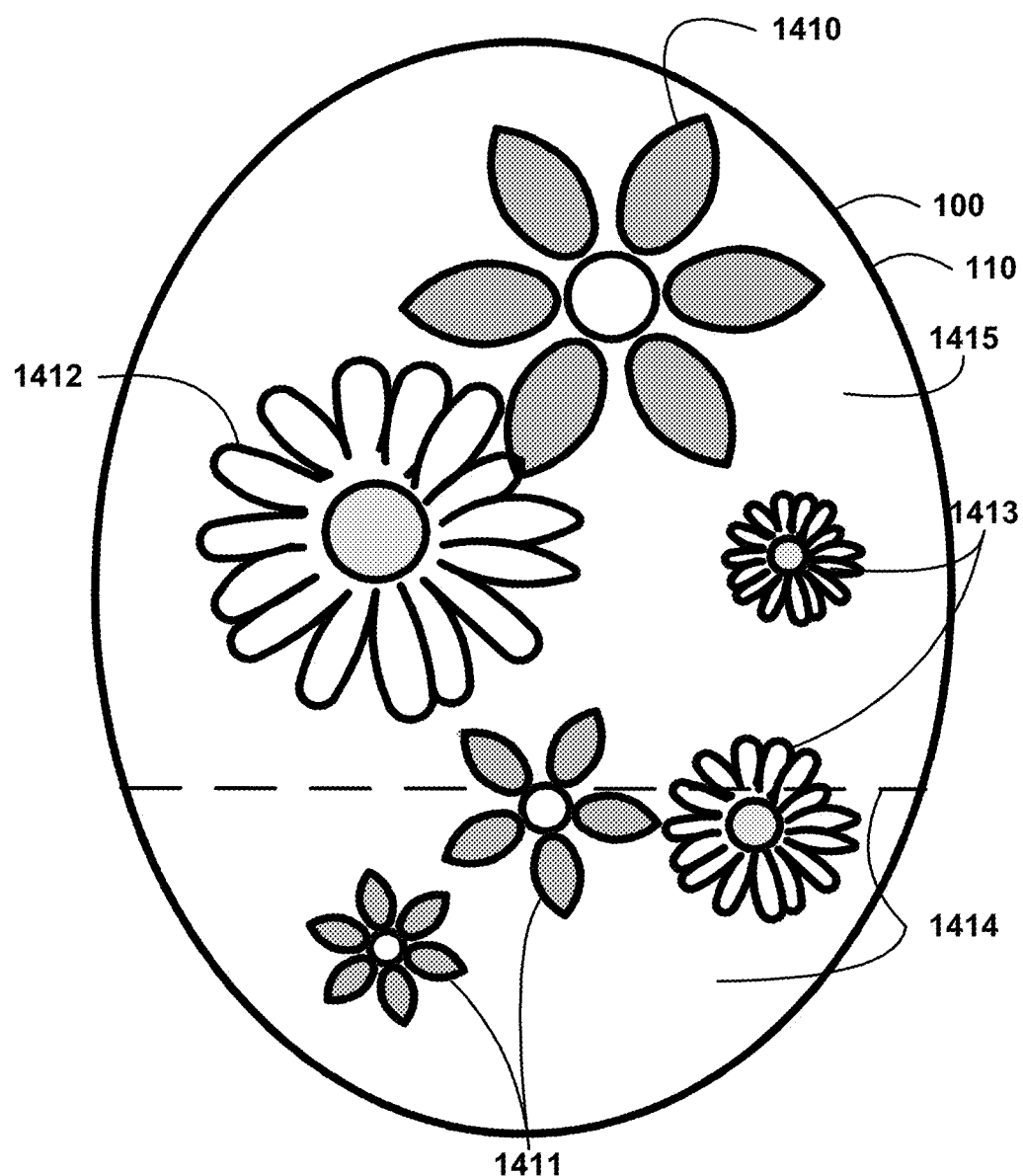
FIG. 14A shows for illustrative purposes only an example of raised flower tab of one embodiment.

Embossed Flower Tab:

FIG. 14A shows for illustrative purposes only an example of embossed flower tab of one embodiment. FIG. 14A shows the ID grab tab 100 in one embodiment of the oval tab with embossed flower feature 110. An embossed floral feature 1410 includes a plurality of a multi-scaled embossed floral feature 1411 and includes an embossed daisy feature 1412 and a plurality of a multi-scaled embossed daisy feature 1413. An adhesive area 1414 is seen on an ID grab tab 100 flexible transparent/translucent plastic tab material 1415 of one embodiment.

Figure 14B:
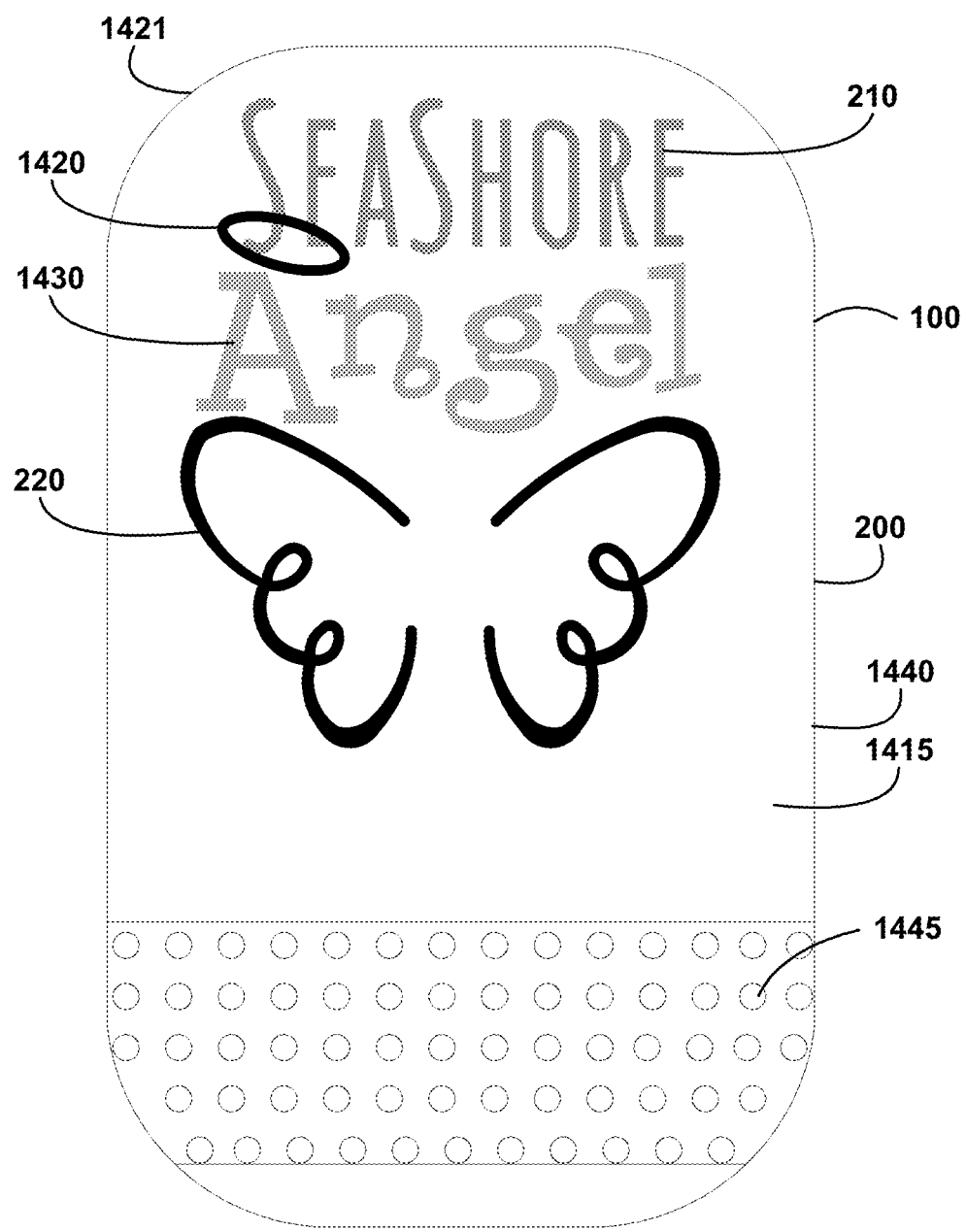
FIG. 14B shows for illustrative purposes only an example of sea shore angel tab of one embodiment.

Sea Shore Angel Tab:

FIG. 14B shows for illustrative purposes only an example of sea shore angel tab of one embodiment. FIG. 14B shows the ID grab tab 100 in an embodiment of the rectangular seashore angel feature ID grab tab 200 that includes embossed tab text 210 and the embossed butterfly feature 220. An embossed halo 1420 and embossed "angel" text 1430 is included in the feature. A dotted adhesive area 1445 is shown as one embodiment of the adhesive applied to the ID grab tab 100. The flexible transparent/translucent plastic tab material 1415 includes a tab filleted corner 1421 at each of the four corners of the filleted rectangular shape 1440 of one embodiment.

Figure 14C:
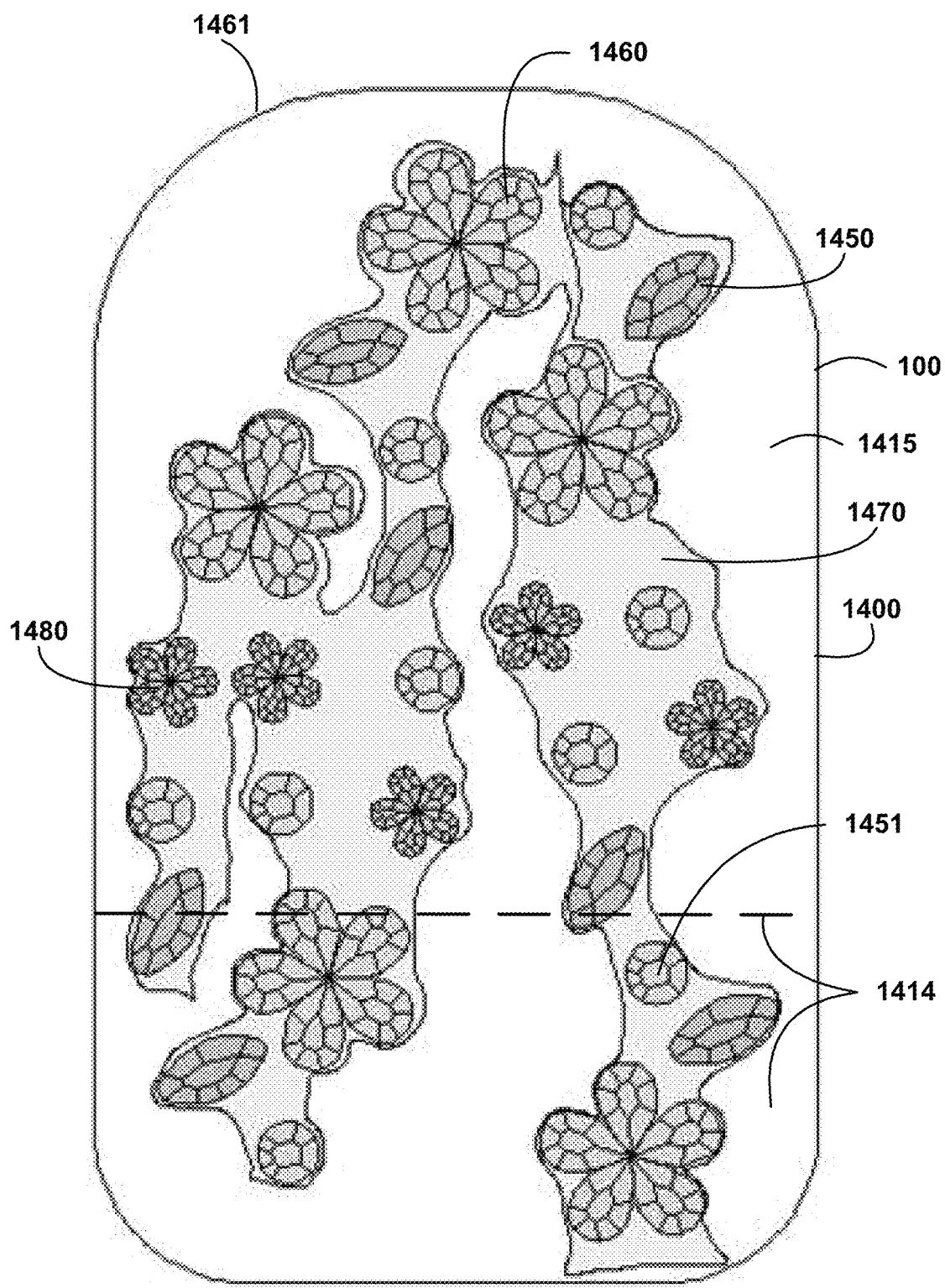
FIG. 14C shows for illustrative purposes only an example of jewel flower tab of one embodiment.

Jewel Flower Tab:

FIG. 14C shows for illustrative purposes only an example of jewel flower tab of one embodiment. FIG. 14C shows the ID grab tab 100 with the flexible transparent/translucent plastic tab material 1415 with a semi-arch shape 1461 at the top edge. An embossed rhinestone tab feature 1400 includes an embossed background 1470 with a plurality of an embossed large rhinestone flower feature 1460, embossed emerald cut rhinestone feature 1450, embossed small rhinestone flower feature 1480, and an embossed round rhinestone feature 1451. In a bottom section of the flexible transparent/translucent plastic tab material 1415 is the adhesive area 1414 of one embodiment.

Figure 15A:
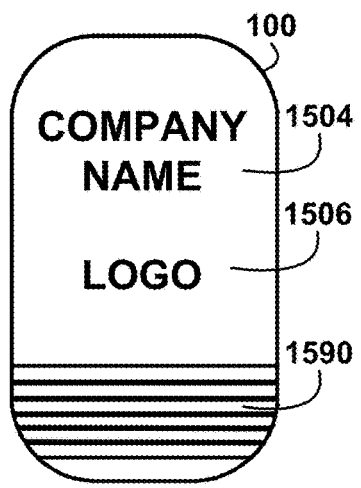
FIG. 15A shows for illustrative purposes only an example of company name and logo tab of one embodiment.

Company Name and Logo Tab:

FIGS. 15A-I show a variety of embossed ID grab tab features that can be produced as a standard product and also made to a user submitted order that serve various desirable likes and purposes of a consumer. The range of features is limitless according to a users' selection. FIG. 15A shows for illustrative purposes only an example of company name and logo tab of one embodiment. FIG. 15A shows the ID grab tab 100 with another embodiment of an adhesive lined strip 1590. The ID grab tab 100 of FIG. 1 can include an embossed company name 1504 and an embossed logo 1506. The company name and logo can include users' favorite stores and products. This also provides an opportunity for both the ID grab tab company and the stores or product manufacturers to provide advertising on ID grab tabs. It also provides an additional source of valuable marketing information to the stores or product manufacturers on their brand popularity with consumers of one embodiment.

Figure 15B:
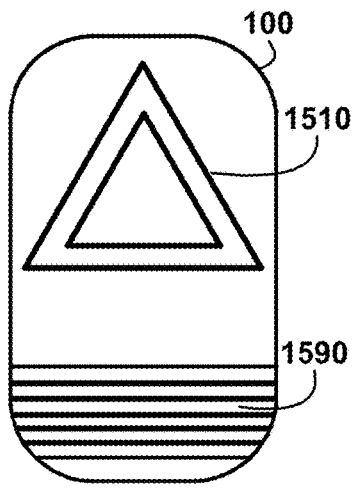
FIG. 15B shows for illustrative purposes only an example of geometric shape tab of one embodiment.

Geometric Shape Tab:

FIG. 15B shows for illustrative purposes only an example of geometric shape tab of one embodiment. FIG. 15B shows the ID grab tab 100 and adhesive lined strip 1590 wherein the tab includes one or more geometric shapes 1510. A user may be more comfortable with geometric shapes to remind them for example of a credit card for clothes shopping that makes them feel like a "star" versus one they prefer for purchases of a "square" meal with restaurant dining. The user may be a Math teacher who enjoys geometry may place significance to a rhomboid and hexagon that identifies one credit card over another of one embodiment.

Figure 15C:
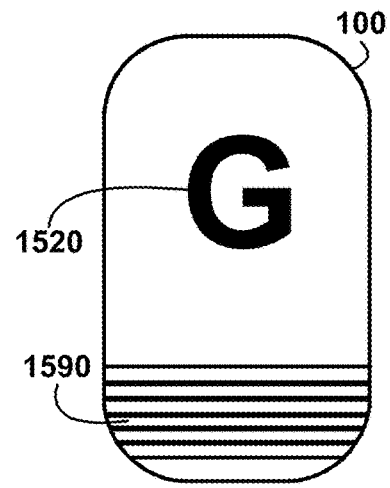
FIG. 15C shows for illustrative purposes only an example of one or more letter tab of one embodiment.

One or More Letter Tab:

FIG. 15C shows for illustrative purposes only an example of one or more letter tab of one embodiment. FIG. 15C shows the ID grab tab 100 and adhesive lined strip 1590 wherein the tab includes one or more embossed letters in a user selected font 1520. A user may be more comfortable with letters to remind them for example of a credit card for clothes shopping versus one they prefer for food purchase or restaurant dining. The letter(s) may represent their personal initials or those of a spouse or friend. A user may place "ABC" on their first choice of credit card to use more frequently and "XYZ" on their last choice. Letters can also be from a non-English alphabet for example a Greek alpha and omega or an Asian alphabet for example Japanese katakana for users in other countries and/or are more familiar and comfortable with a language other than English of one embodiment.

Figure 15D:
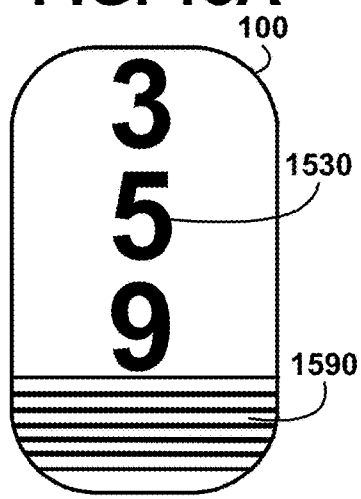
FIG. 15D shows for illustrative purposes only an example of one or more number tab of one embodiment.

One or More Number Tab:

FIG. 15D shows for illustrative purposes only an example of one or more number tab of one embodiment. FIG. 15D shows the ID grab tab 100 and adhesive lined strip 1590 wherein the tab includes one or more embossed numbers 1530. A user may be more comfortable with numbers to signify for example an ordinate choice of their credit cards. They may be in a field of science where the number could carry a formula meaning familiar to them or another meaning that may by user choice be obscure to others. The numbers could signify important dates for example an anniversary or birthday for the user of one embodiment.

Figure 15E:
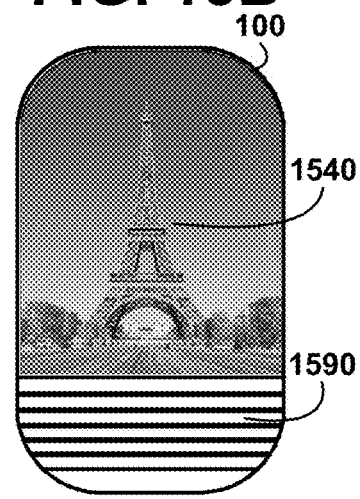
FIG. 15E shows for illustrative purposes only an example of photo tab of one embodiment.

Photo Tab:

FIG. 15E shows for illustrative purposes only an example of photo tab of one embodiment. FIG. 15E shows the ID grab tab 100 and adhesive lined strip 1590 wherein the tab feature includes an embossed photo or image of an iconic landmark of their favorite vacation spot, their birthplace, and a location from their bucket list 1540 of one embodiment.

Figure 15F:
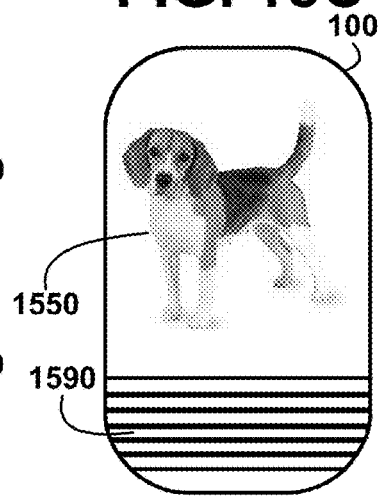
FIG. 15F shows for illustrative purposes only an example of animal figure tab of one embodiment.

Animal Figure Tab:

FIG. 15F shows for illustrative purposes only an example of animal figure tab of one embodiment. FIG. 15F shows the ID grab tab 100 and adhesive lined strip 1590 wherein the tab feature includes an embossed photo or image of an animal, bird or other creature 1550. A user may desire a photo of their pet or favorite farm animal, or of an unusual creature they have encountered or even a legendary mythology beast for example a dragon of one embodiment.

Figure 15G:
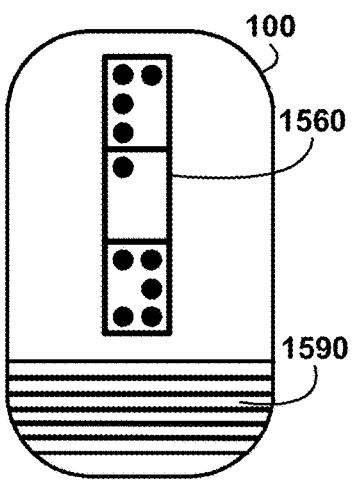
FIG. 15G shows for illustrative purposes only an example of raised braille tab of one embodiment.

Embossed Braille Tab:

FIG. 15G shows for illustrative purposes only an example of embossed braille tab of one embodiment. FIG. 15G shows the ID grab tab 100 and adhesive lined strip 1590. The ID grab tab 100 can provide more than easy handling of a credit card or other object. Users who are blind or have impaired vision may not be able to see which card they are grabbing for in their wallet or purse. The user may feel uncomfortable asking strangers for assistance in discerning one of their credit cards from another. This may even occur with cash bills. The raised lettering 150 of FIG. 1 includes the card number but may not be easy to decipher.

The ID grab tab 100 can include tab features including embossed braille letters, numbers or characters as shown in this example the braille letters spell "pay" 1560. The blind and hard of sight can use braille letters numbers or characters to more readily identify one card from another for a particular purchase. The ID grab tab 100 could be adhered to individual envelopes carried by the user which identifies cash bill denominations in each of the envelopes to assist them in making purchases without asking strangers for help. Even for those with limited or no sight who may not know braille, the embossed tab features including letters, numbers, shapes, and images found on the ID grab tab 100 may assist them in a similar fashion as those who are familiar with braille by choosing tab features whose embossing can easily be distinguished by touch of a finger of one embodiment.

Figure 15H:
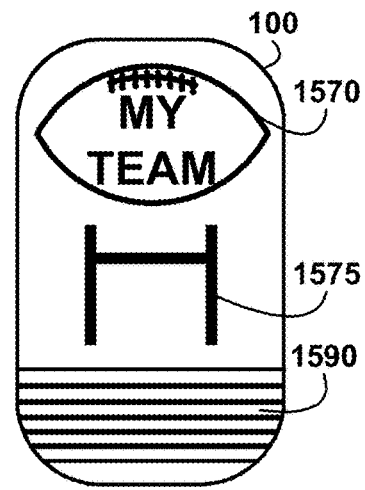
FIG. 15H shows for illustrative purposes only an example of sports tab of one embodiment.

Sports Tab:

FIG. 15H shows for illustrative purposes only an example of sports tab of one embodiment. FIG. 15H shows the ID grab tab 100 and adhesive lined strip 1590. The ID grab tab 100 can include embossed sports equipment and team names for example a football and "My Team" name 1570 including a baseball, baseball bat or glove, a tennis racket, golf club, soccer ball or other piece of sports equipment that suits the user. An embossed tab feature can include a sports item for example football goal posts, baseball diamond, tennis net, soccer goal net, or other symbolic sports image 1575 can be included.

Licensing from sports organizations can provide the ID grab tab company with additional revenue. The opportunity to build fan loyalty for the sports organization can be invaluable for game attendance and purchases of other items associated with that organizations' team. The advertising opportunity with sports equipment manufacturers will also benefit those manufacturers and the credit card company when the manufacturers' logo is seen often by the user of one embodiment.

Figure 15I:
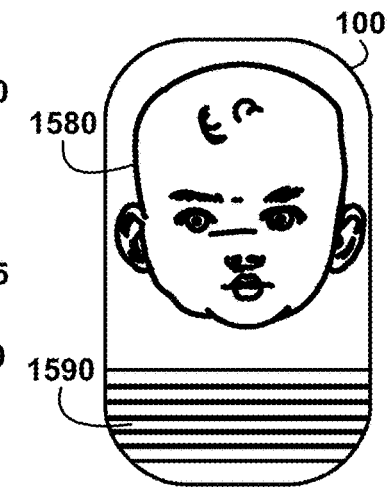
FIG. 15I shows for illustrative purposes only an example of person face tab of one embodiment.

Person Face Tab:

FIG. 15I shows for illustrative purposes only an example of person face tab of one embodiment. FIG. 15I shows the ID grab tab 100 and adhesive lined strip 1590. The ID grab tab can include an embossed photo or outline of a face from a photo 1580 of a family member, friend or other person. The embossing of a photo and even the outline of a face from a photo can be topographically created by a scanner and computer with a processor to measure light intensity and color boundaries within the photo.

The measured light intensity and color boundaries can be used to create outlines and raise and lower photographic sections by color as seen in paintings where generally the darker images tend to denote distant backgrounds where the highlighted sections appear more in the foreground. These perspective relationships can be converted into the height of the tab feature photo content for raising and lowering heights of the embossment of one embodiment.

Figure 16A:
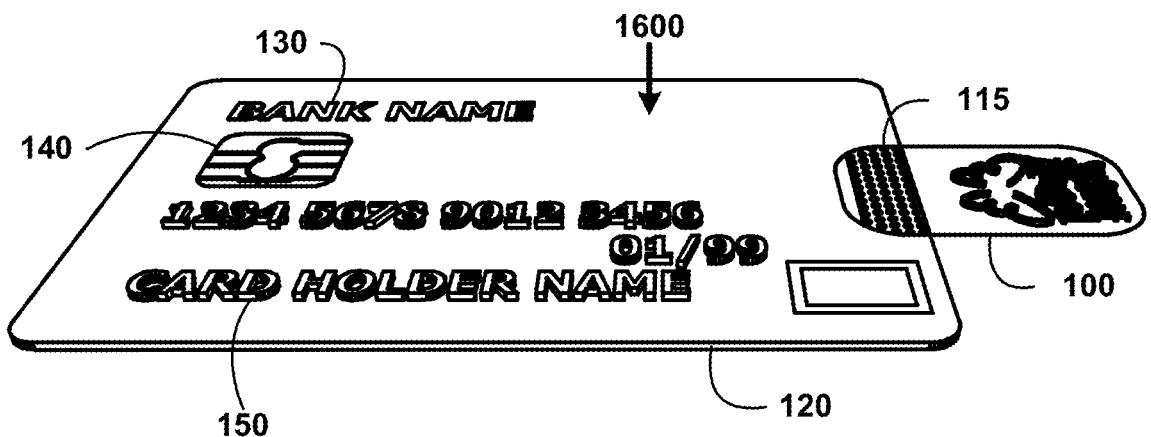
FIG. 16A shows for illustrative purposes only an example of credit card raised lettering of one embodiment.

Credit Card Raised Lettering:

FIG. 16A shows for illustrative purposes only an example of credit card raised lettering of one embodiment. FIG. 16A shows the credit card 120 with a printed bank name 130 where the printed name of the bank is flush with the face of the card. Also seen is the chip 140 and raised lettering 150 above the credit card face 1600. In this example the ID grab tab 100 is adhered on credit card face 115 of one embodiment.

Figure 16B:
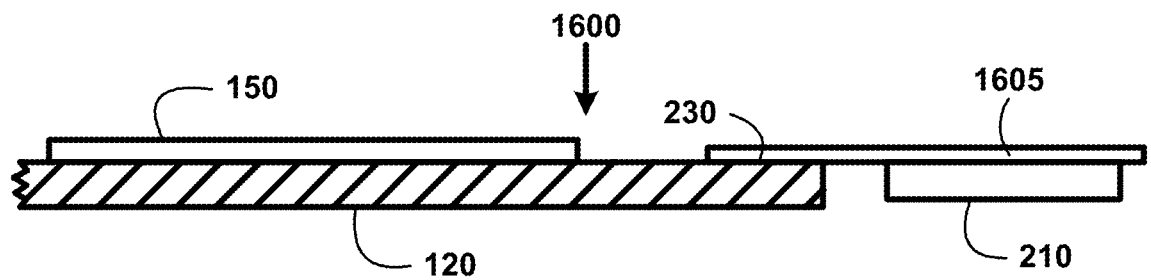
FIG. 16B shows for illustrative purposes only an example of flat tab profile of one embodiment.

Flat Tab Profile:

FIG. 16B shows for illustrative purposes only an example of flat tab profile of one embodiment. FIG. 16B shows the surface of the credit card face 1600 with the raised lettering 150 of the credit card 120. The ID grab tab 100 of FIG. 1 is constant thickness plastic tab with embossed lettering 1605 including embossed tab text 210. The adhesive area 230 is used to attach the constant thickness plastic tab with embossed lettering 1605 to the credit card face 1600 of one embodiment.

Figure 16C:
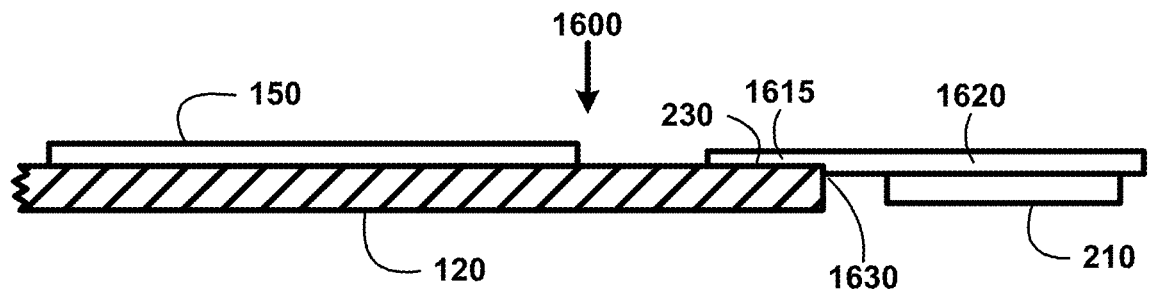
FIG. 16C shows for illustrative purposes only an example of tab ledge profile of one embodiment.

Tab Ledge Profile:

FIG. 16C shows for illustrative purposes only an example of tab ledge profile of one embodiment. FIG. 16C shows the credit card 120, credit card face 1600 and raised lettering 150. The adhesive area 230 is shown on the bottom surface of a first tab thickness adhered to the face of the credit card 1615. The embossed tab text 210 is on the bottom surface of a second tab thickness extending away for the credit card edge 1620. The difference in the first tab thickness and the second tab thickness forms a card edge alignment ledge 1630 used to position the ID grab tab 100 of FIG. 1 against the edge of the credit card 120. The embossed tab text extends below the second tab thickness with an embossed depth that does not extend past the opposing surface of the credit card of one embodiment.

Figure 16D:
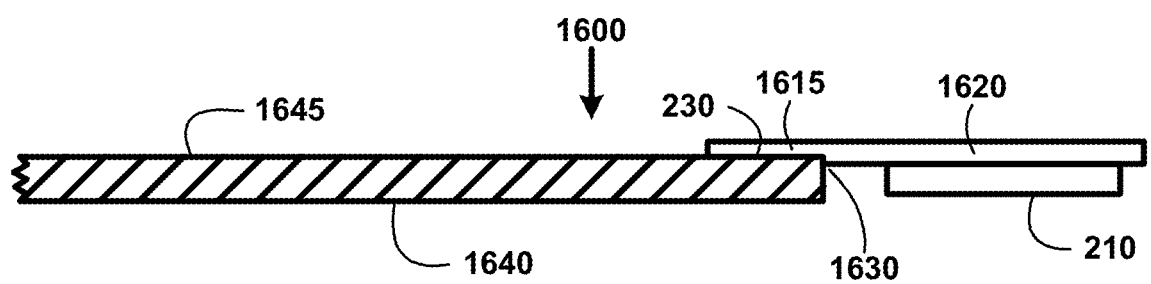
FIG. 16D shows for illustrative purposes only an example of flat printed credit card tab profile of one embodiment.

Flat Printed Credit Card Tab Profile:

FIG. 16D shows for illustrative purposes only an example of flat printed credit card tab profile of one embodiment. FIG. 16D shows the ID grab tab 100 of FIG. 1 with the embossed tab text 210, adhesive area 230, card edge alignment ledge 1630, the first tab thickness adhered to the face of the credit card 1615 and the second tab thickness extending away for the credit card edge 1620. The adhesive area 230 is attached to the face of a flat printed credit card with no raised lettering 1640. The flat printed credit card face lettering 1645 is growing in popularity with credit card and bank companies due to a lower cost and ability to print them on demand on site.

The use of credit card imprint machines and slips has greatly diminished with the advent of electronic card readers initially for the magnetic strips and in addition the credit card chips. The need for raised lettering for imprinting credit card sales information is on the way out. Currently ATM machines are built to factor in the raised lettering added thickness of a credit card. It may take some time for those to be phased out but sometime it may start to occur. The ID grab tab 100 of FIG. 1 is configured to make that transition by creating the embossed tab features including letters, numbers and images within the thickness of a standard credit card thickness.

The credit and other card thicknesses are subject to international standards that control the use of card so that banking ATM and other purchase equipment for credit card transaction remains standardized and a traveler does not encounter difficulties using their credit cards in every country or locale they travel through of one embodiment.

Figure 17A:
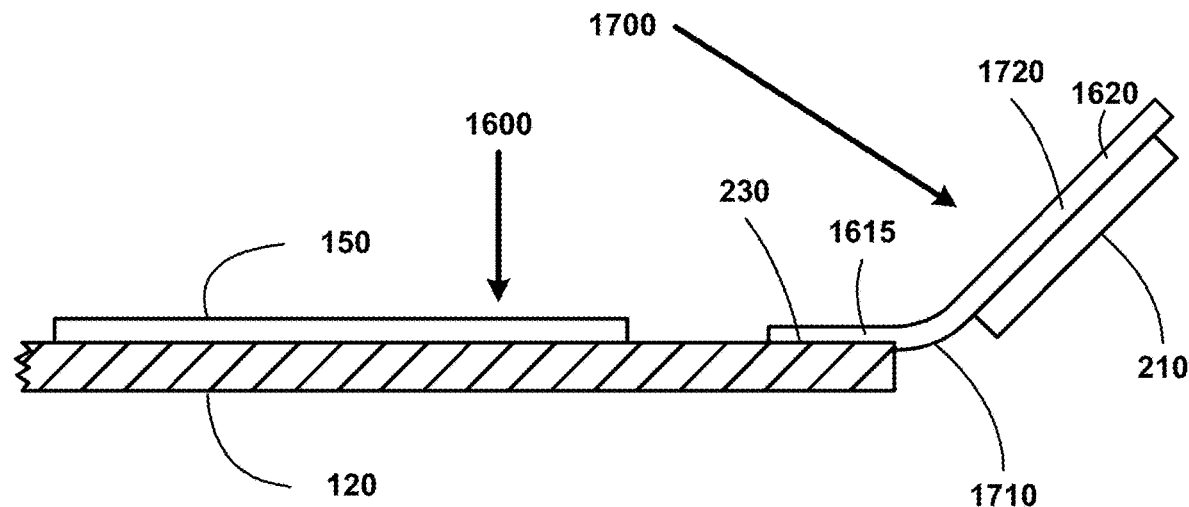
FIG. 17A shows for illustrative purposes only an example of an angled tab of one embodiment.

An Angled Tab:

FIG. 17A shows for illustrative purposes only an example of an angled tab of one embodiment. FIG. 17A shows an angled ID grab tab 1700 wherein the angled orientation is to provide more space for gripping and pulling a credit card from a wallet card holder. FIG. 17A shows the credit card 120, credit card face 1600, raised lettering 150, adhesive area 230, first tab thickness adhered to the face of the credit card 1615 and the second tab thickness extending away for the credit card edge 1620. The embossed tab text 210 maintains a planar orientation against the bottom surface of the ID grab tab 100 of FIG. 1. An angled bend in the ID grab tab 1710 in proximity to the credit card 120 edge elevated the tab above the surface of the credit card face in this example providing the user with additional space to more easily grip the tab of one embodiment.

Figure 17B:
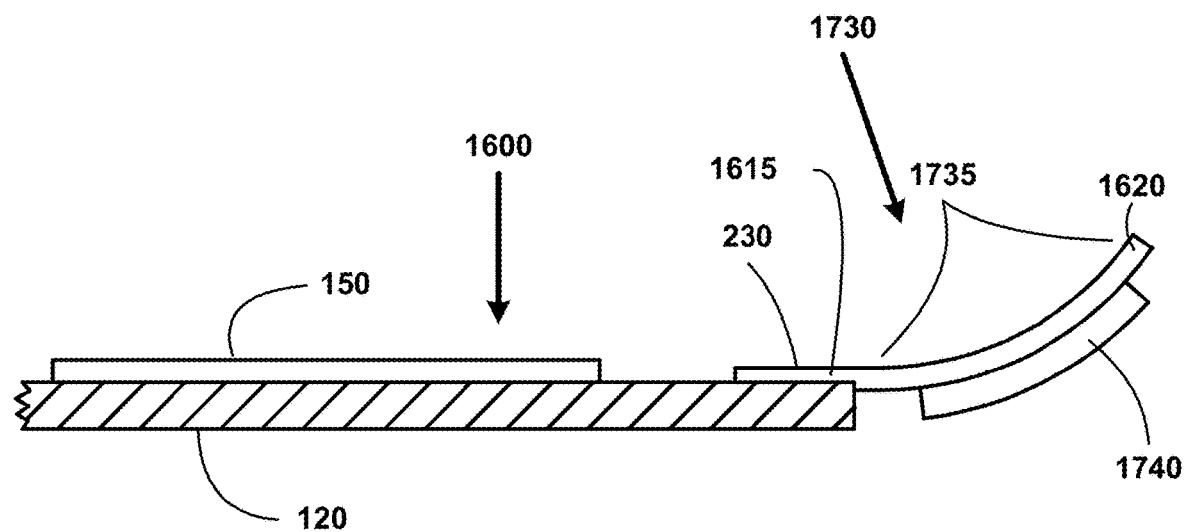
FIG. 17B shows for illustrative purposes only an example of a curved tab of one embodiment.

A Curved Tab:

FIG. 17B shows for illustrative purposes only an example of a curved tab of one embodiment. FIG. 17B shows a curved ID grab tab 1730 to provide more space for gripping and pulling a credit card from a wallet card holder. FIG. 17B shows the credit card 120, credit card face 1600, raised lettering 150, adhesive area 230, first tab thickness adhered to the face of the credit card 1615 and the second tab thickness extending away for the credit card edge 1620. A formed curvature 1735 begins in proximity to the credit card 120 and continues to the tab tip. Conforming to the formed curvature 1735 is curved embossed tab text 1740.

In this example the curved embossed tab text 1740 can be applied to the flexible transparent/translucent plastic tab material 1415 of FIG. 14A during a roller printing process wherein the embossing material for the feature is applied as the flexible transparent/translucent plastic tab material 1415 of FIG. 14A passes over the roller. An application of heat can also be applied during the roller printing process to form the curvature of one embodiment.

Figure 18:
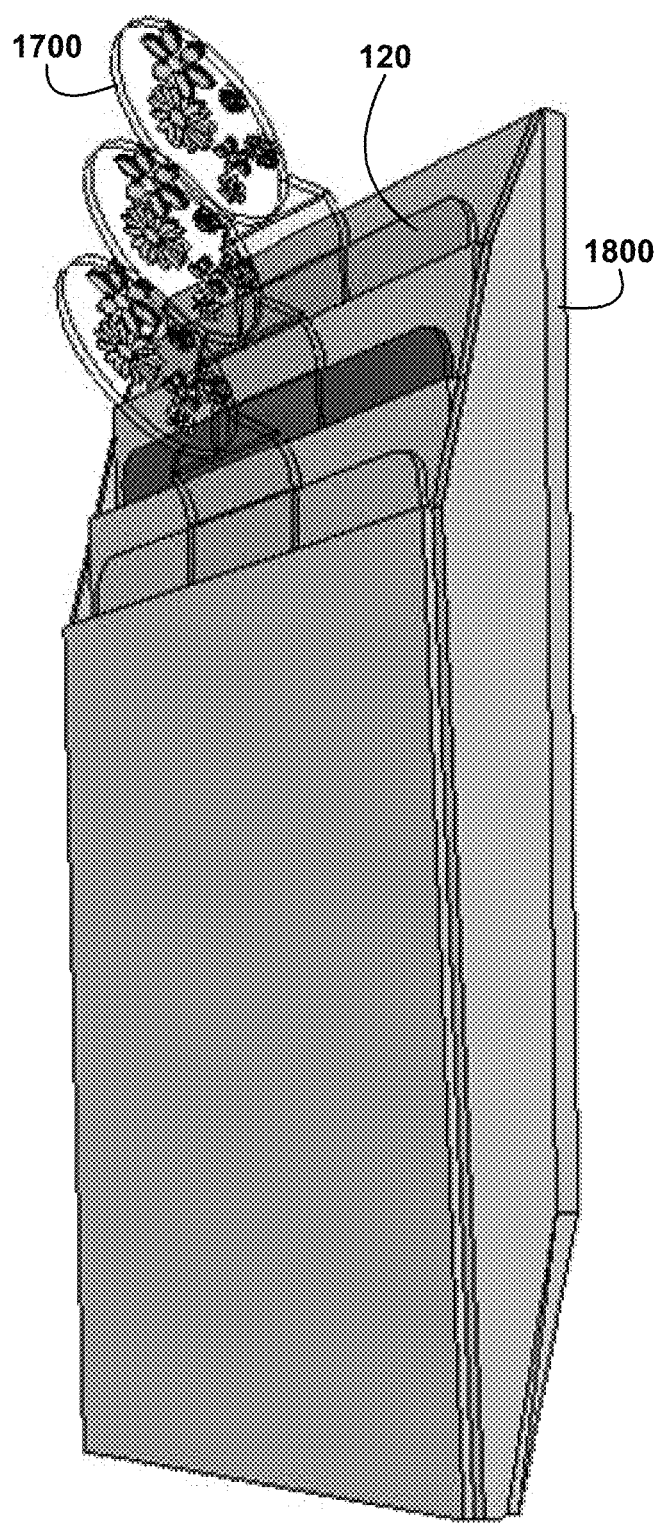
FIG. 18 shows for illustrative purposes only an example of credit cards with tabs in a wallet credit card slotted holder of one embodiment.

Credit Cards with Tabs in a Wallet Credit Card Slotted Holder:

FIG. 18 shows for illustrative purposes only an example of credit cards with tabs in a wallet credit card slotted holder of one embodiment. FIG. 18 shows for example a group of three credit cards in a wallet credit card slotted holder 1800. Each credit card 120 includes the angled ID grab tab 1700 adhered to the credit card face surface. The angled ID grab tab 1700 is clearly seen angled away from the wallet and other card surfaces making it easier for a hand with long nails to grip the angled ID grab tab 1700 without chipping or breaking a nail digging the card out of the slot holder of one embodiment.

Figure 19:
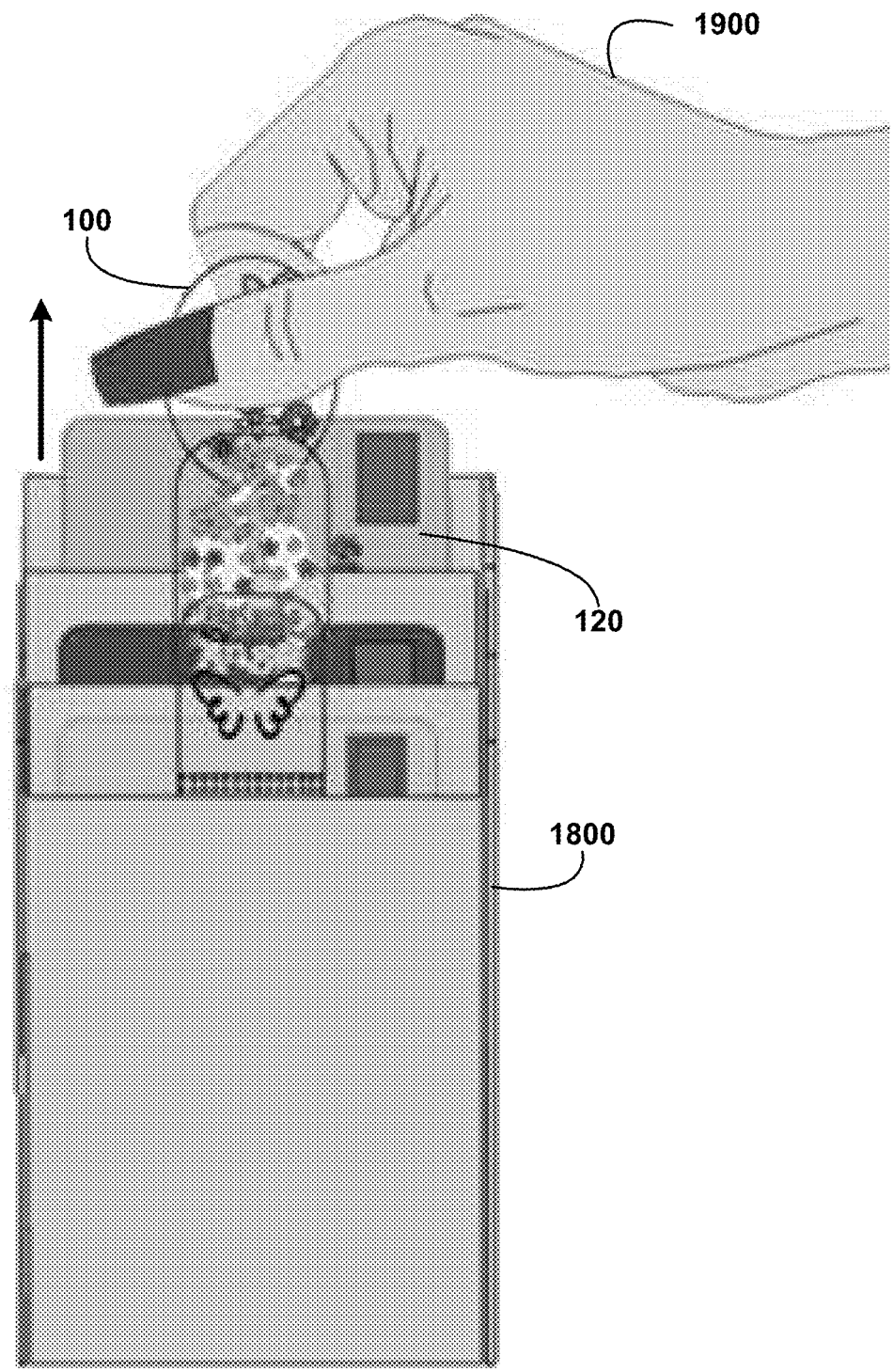
FIG. 19 shows for illustrative purposes only an example of hand with long nails pulling credit cards with tab out of a wallet credit card slotted holder of one embodiment.

Hand with Long Nails Pulling Credit Cards with Tab Out of a Wallet Credit Card Slotted Holder:

FIG. 19 shows for illustrative purposes only an example of hand with long nails pulling credit cards with tab out of a wallet credit card slotted holder of one embodiment.

FIG. 19 shows the wallet credit card slotted holder 1800 with in this example three of the credit cards 120 with an adhered ID grab tab 100. A hand with long nails pulling a credit card out of a wallet using the ID grab tab 1900 is seen being able to easily grip the ID grab tab 100 of one embodiment.

Figure 20:
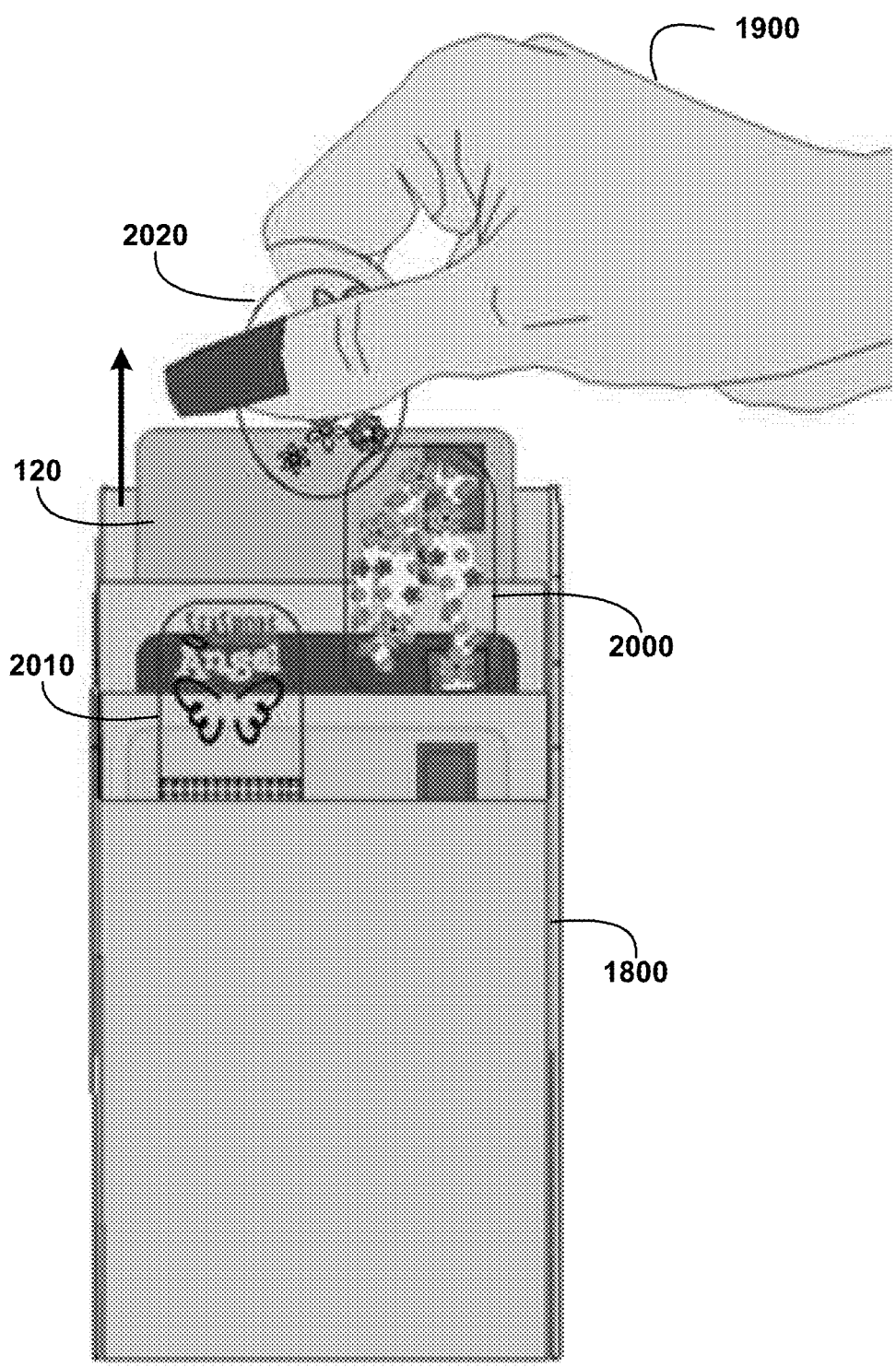
FIG. 20 shows for illustrative purposes only an example of hand with long nails pulling credit cards with staggered coupled tab out of a wallet credit card slotted holder of one embodiment.

Hand with Long Nails Pulling Credit Cards with Staggered Coupled Tab Out of a Wallet Credit Card Slotted Holder:

FIG. 20 shows for illustrative purposes only an example of hand with long nails pulling credit cards with staggered coupled tab out of a wallet credit card slotted holder of one embodiment. FIG. 20 shows the wallet credit card slotted holder 1800 with the credit card 120 with the ID grab tab 100 attached. The hand with long nails pulling a credit card out of a wallet using the ID grab tab 1900 can be seen. In this embodiment an ID grab tab adhered to a staggered left position 2010, an ID grab tab adhered to a staggered right position 2000 and an ID grab tab adhered to a staggered center position 2020 shows that staggering the positions of the ID grab tabs for a user may make gripping even easier of one embodiment.

Figure 21A:
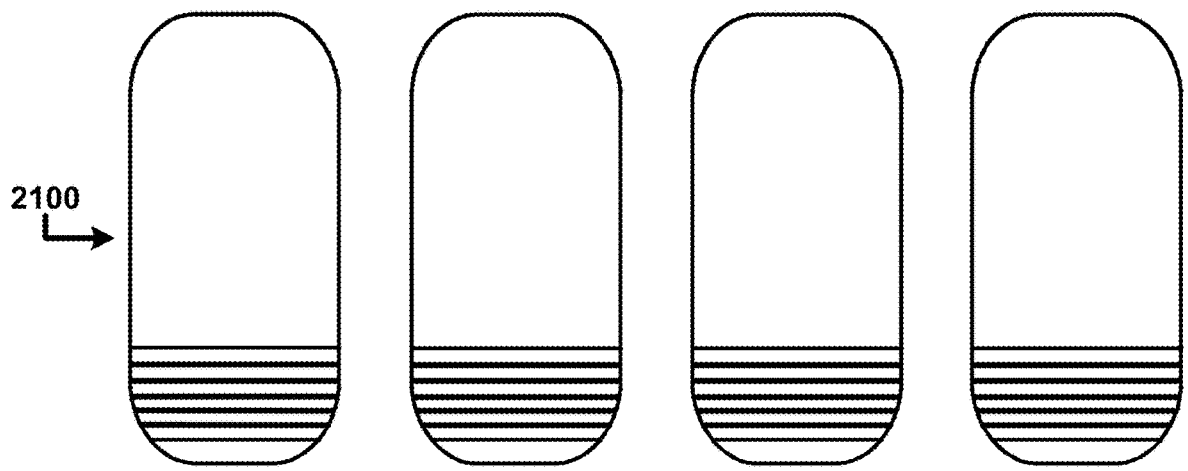
FIG. 21A shows for illustrative purposes only an example of first width tabs of one embodiment.

First Width Tabs:

FIG. 21A shows for illustrative purposes only an example of first width tabs of one embodiment. FIG. 21A shows a grouping of a plurality of a first width ID grab tabs 2100 spanning a certain distance for comparison purposes only. Staggering the positioning of ID grab tabs on a number of credit cards can make gripping a credit card easier for a user. However some wallets have slots a great number of credit cards. The greater the number of cards the greater the difficulty in staggering the tabs without overlapping the tabs. The ID grab tabs 100 of FIG. 1 can be made at any width and length. The ID grab tabs are shown without embossment for illustrative clarity only of one embodiment.

Figure 21B:
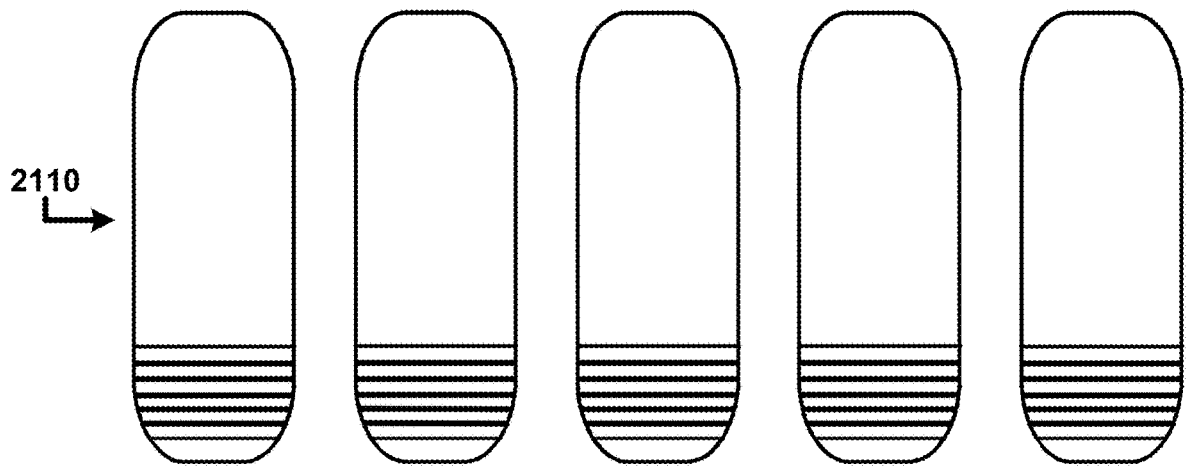
FIG. 21B shows for illustrative purposes only an example of second width tabs of one embodiment.

Second Width Tabs:

FIG. 21B shows for illustrative purposes only an example of second width tabs of one embodiment. FIG. 21B shows a plurality of a second width ID grab tabs 2110 spanning a certain distance for comparison purposes only. In this embodiment the certain distance is approximately the same as that shown in FIG. 21A. The reduction in the width from the first width to the second width provides for one additional tab in the same distance for staggering the positioning of ID grab tabs on a number of credit cards without overlapping. The ID grab tabs are shown without embossment for illustrative clarity only of one embodiment.

Figure 21C:
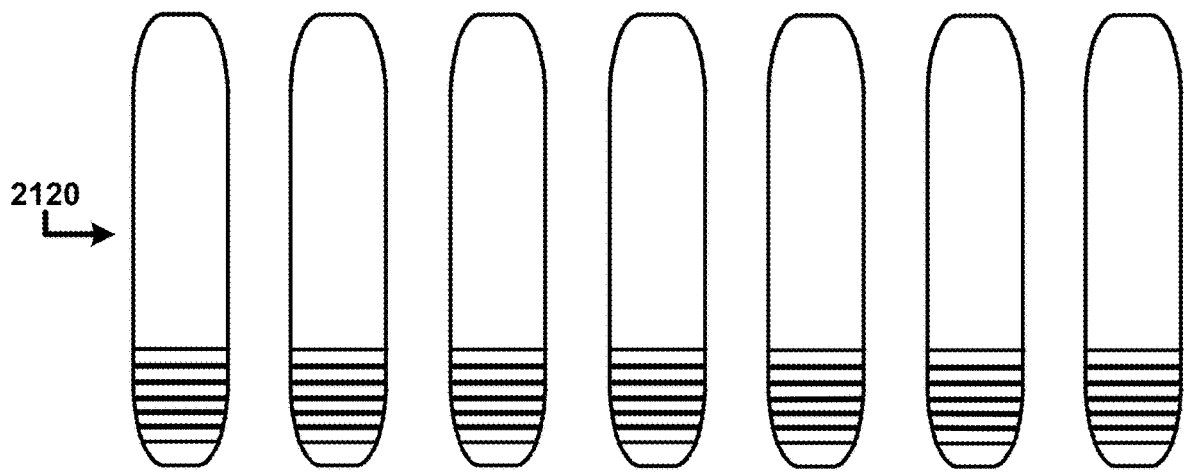
FIG. 21C shows for illustrative purposes only an example of third width tabs of one embodiment.

Third Width Tabs:

FIG. 21C shows for illustrative purposes only an example of third width tabs of one embodiment. FIG. 21C shows a plurality of a third width ID grab tabs 2120 spanning a certain distance for comparison purposes only. The reduction in the width from the first width to the third width provides for three additional tabs in the same distance for staggering the positioning of ID grab tabs on a number of credit cards without overlapping. The comparison between the width of the ID grab tabs between FIGS. 21A, B and C demonstrates that within the same distance the number of staggered ID grab tab positions increases with the reduction in width of one embodiment.

Figure 22A:
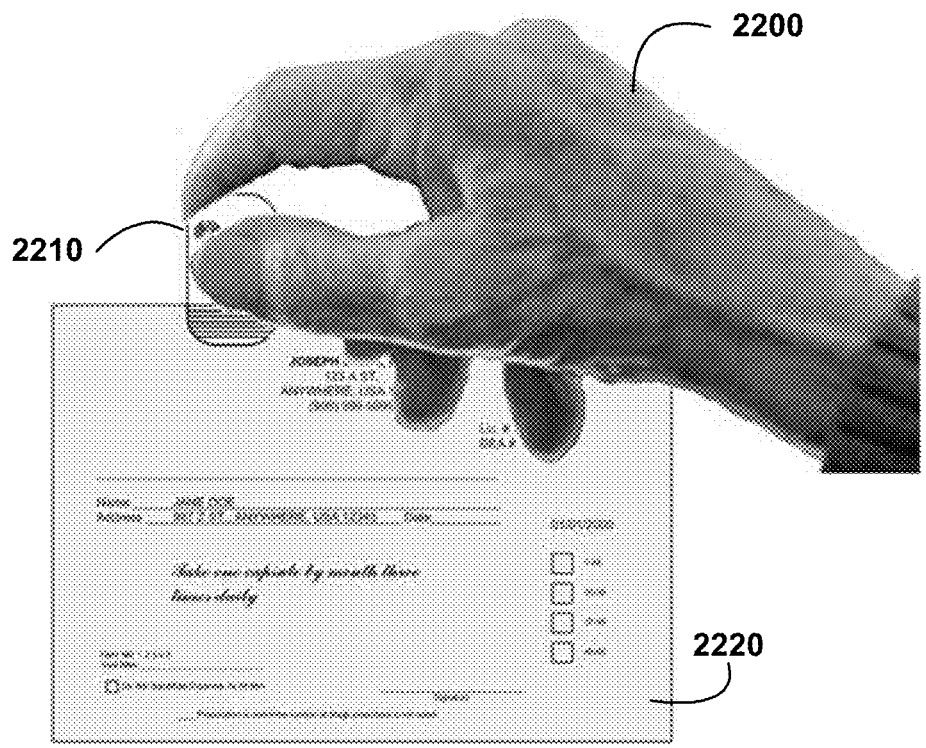
FIG. 22A shows for illustrative purposes only an example of elderly person using tab on prescription of one embodiment.

Elderly Person Using Tab on Prescription:

FIG. 22A shows for illustrative purposes only an example of elderly person using tab on prescription of one embodiment. FIG. 22A shows an elderly person hand 2200 gripping an ID grab tab adhered to prescription 2210. The loss of manual dexterity may afflict elderly persons who may suffer difficulties in picking up pieces of paper for example a medical prescription form 2220. The ID grab tab feature having a tactile surface of the embossed image and being flexible can facilitate their ability to easily handle the piece of paper of one embodiment.

Figure 22B:
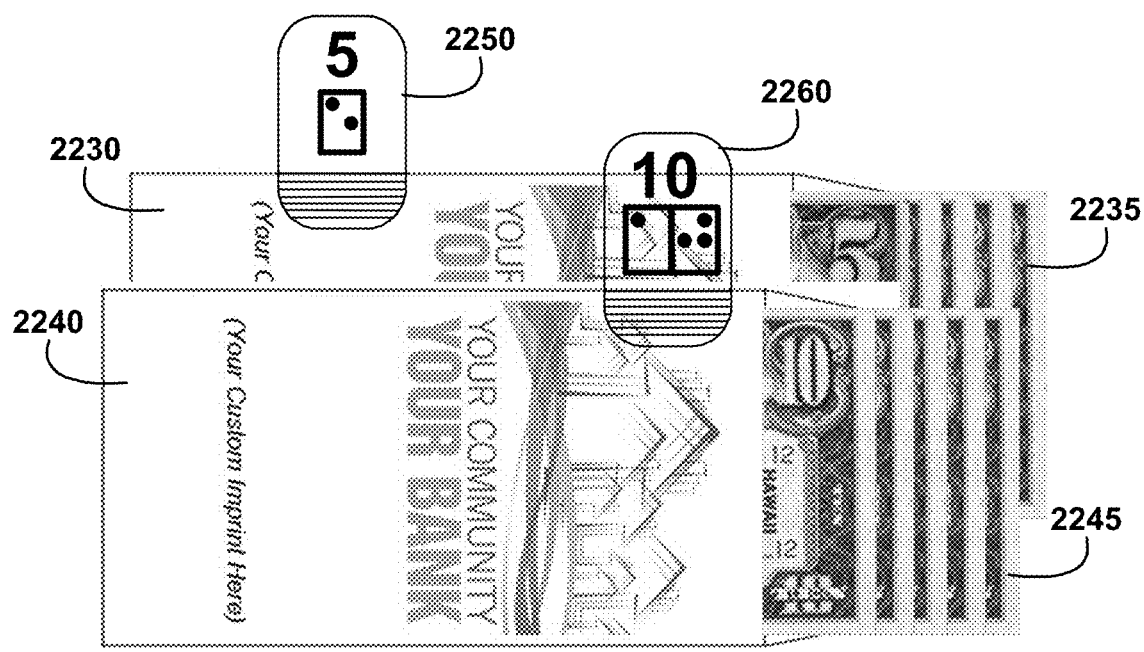
FIG. 22B shows for illustrative purposes only an example of tabs to ID denominations of cash in envelopes of one embodiment.

Tabs to ID Denominations of Cash in Envelopes:

FIG. 22B shows for illustrative purposes only an example of tabs to ID denominations of cash in envelopes of one embodiment. FIG. 22B shows a bank cash envelope with $5 bills 2230. When for example a blind person or a person with vision impairment condition can ask a bank teller to place each denomination into separate bill envelopes and affix the corresponding tab to the envelopes. The $5 bills 2235 using an ID grab tab with a number 5 and in braille 2250 adhered to the envelope allows the person to identify which envelope contains the $5 bills 2235. A bank cash envelope with $10 bills 2240 with an ID grab tab with a number 10 and in braille 2260 can assist the vision impaired person to determine which envelope contains the $10 bills 2245. The vision impaired person can go about their purchases with an improved sense of independence and confidence of one embodiment.

Figure 23:
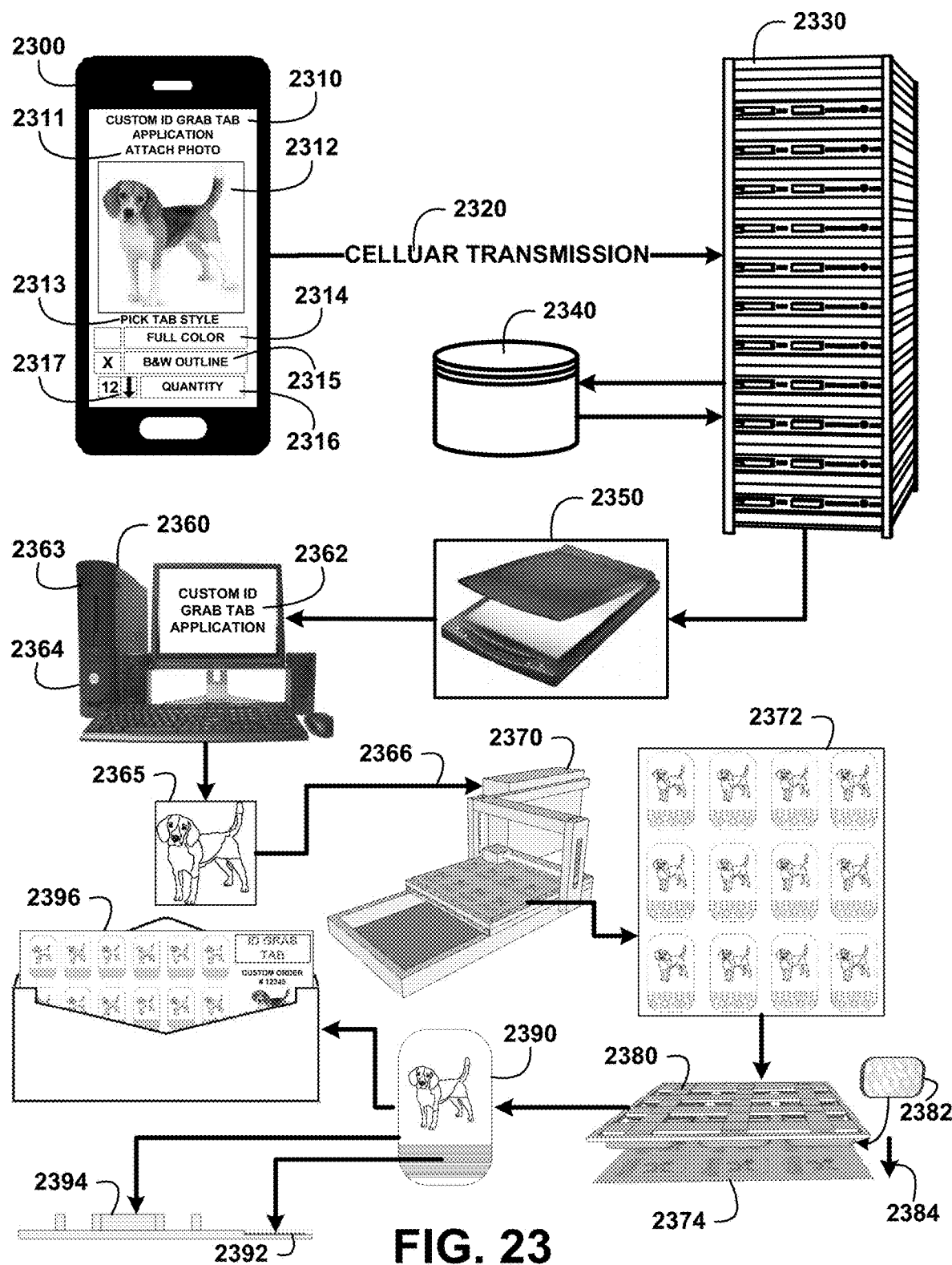
FIG. 23 shows for illustrative purposes only an example of custom tab order processing of one embodiment.

Custom Tab Order Processing:

FIG. 23 shows for illustrative purposes only an example of custom tab order processing of one embodiment. FIG. 23 shows a user smart phone with 2300 a custom ID grab tab application installed 2310. The ID grab tab application can include voice audio instructions and visual textual instructions to for example attach photo 2311 for the user to order a custom ID grab tab. In this example a photo attached by user 2312 may be of their pet dog. The next ID grab tab application instruction is to pick tab style 2313 including for example a full color 2314 or a B&W outline 2315. In this example the B&W outline 2315 is selected.

A user then selects a quantity 2316 of tabs to order using a drop down quantity choice for example 12 2317. The instructions can include a selection of tab width for staggering or other user reasons. The final instructions include the user contact information and payment method for example by credit card. The users' smart phone with 2300 a custom ID grab tab application installed 2310 performs a cellular transmission 2320 after the user presses an order placement icon. An ID grab tab server 2330 records the user custom order information and data including the submitted photo in an ID grab tab database 2340.

The recorded photo is processed in a digital scanner 2350. The scanned photo is further processed in an ID grab tab computer 2360. The computer with the custom ID grab tab application installed 2362 includes a digital processor 2363, and a photo analyzer for determining light intensity and contrast borders 2364, The photo analyzer performs the light intensity and contrast borders according to the user selected tab style. Once the light intensity and contrast borders are determined the photo analysis in one embodiment is converted to a 3D printer format 2366 and transmitted to a 3D printer processor 2370 for printing the embossed tab feature.

The 3D printer processor produces a sheet of 3D printed custom order embossed tabs 2372. The sheet of 3D printed custom order embossed tabs 2372 is conveyed to a tab cutting processor 2380. An array of a plurality of a tab cutter device 2382 is used to cut out the individual tabs from the 3D printed sheet. A tab cutting processor pressed into the sheet of 3D printed tabs 2374 performs the cutting of the tabs. An adhesive applicator then applies an adhesive to the cut tabs in a tab adhesive area 2392. Cut custom tabs with adhesive material applied 2390 show an embossed custom photo outline relief 2394 rising above the tab flexible material. Cut tabs are affixed to a custom order delivery board and mailed to custom order user 2396 to complete the users' custom order of one embodiment.

The foregoing has described the principles, embodiments and modes of operation of the embodiments. However, the embodiments should not be construed as being limited to the particular embodiments discussed. The above described embodiments should be regarded as illustrative rather than restrictive, and it should be appreciated that variations may be made in those embodiments by workers skilled in the art without departing from the scope of the present invention as defined by the following claims.

What is claimed is:

1. A method, comprising:
   providing a user interface configured to allow a user to order a custom card grab tab with custom features;
   wherein the user interface includes a voice audio module to allow a user to use voice commands to attach a digital photo for incorporation into a custom card grab tab;
   printing 3D custom features including raised custom features using a 3D printer;
   wherein the 3D printed custom features are printed at a distal end of a custom card grab tab for creating a tactile relief gripping surface and for identifying the custom feature;
   wherein the 3D printed custom feature of a digital photo and an outline of a face from a digital photo are converted into a 3D printing format using a scanner and computer with a processor to measure light intensity and color boundaries within the digital photo for creating raised custom features of the digital photo on the custom card grab tab; and
   fabricating the card grab tab with an adhesive section on a proximal end for being adhered to a card, wherein the card grab tab facilitates gripping by a thumb and fingers to allow movement of the object.

2. The method of claim 1, wherein fabricating the card grab tab includes using a custom card grab tab order process configured for using a user submitted photographic feature to an card grab tab server and recorded on a card grab tab database wherein the recorded photographic feature is processed on a card grab tab computer with a photo analyzer for determining light intensity and contrast borders according to a user selected tab style and converted to a 3D printing format for creating the tactile relief gripping surface.

3. The method of claim 1, further comprising embossing a feature including a sea shore angel feature embossed sea shore angel text, an embossed butterfly feature and an embossed halo.

4. The method of claim 1, further comprising embossing a feature including an embossed rhinestone feature including an embossed background with a plurality of an embossed large rhinestone flower feature, embossed emerald cut rhinestone feature, embossed small rhinestone flower feature and an embossed round rhinestone feature.

5. The method of claim 1, further comprising embossing a feature including a company name and logo feature of a user favorite store and product and for advertising on the card grab tab.

6. The method of claim 1, further comprising embossing a feature including one or more embossed geometric shapes including user selected geometric shapes including a triangle, star, square, rhomboid, hexagon and other geometric shapes that can be used to identify one credit card over another.

7. The method of claim 1, further comprising embossing a feature including one or more embossed letter in a feature including letters in an English alphabet and other language alphabets for users in other countries and/or is more familiar and comfortable with a language other than English.

8. The method of claim 1, further comprising embossing a feature including one or more embossed number in a feature for a user more comfortable with numbers to signify their choice of their credit cards.

9. The method of claim 1, further comprising embossing a feature including an embossed photo or image of an iconic landmark of their favorite vacation spot, their birthplace, a location from their bucket list.

10. The method of claim 1, further comprising embossing a feature including an embossed photo or image of an animal, bird or other creature including a user pet, favorite farm animal, an unusual creature they have encountered, and a legendary mythology beast including a dragon.

11. A tab apparatus, comprising:
a user interface configured to allow a user to order a custom card grab tab with custom features;
wherein the user interface includes a voice audio module to allow a user to use voice commands to attach a digital photo stored on a digital database coupled to the user interface for incorporation into the custom card grab tab;
a 3D printer configured to emboss on a distal end of the custom card grab tab the custom feature for creating a tactile relief gripping surface for identifying the custom features;
wherein a scanner and computer with a processor are used to measure light intensity and color boundaries within a digital photo for converting the digital photo to 3D printing format configured to create raised features of the digital photo with the 3D printer; and
an adhesive section on a proximal end configured for being adhered to a card, wherein the card grab tab facilitates gripping by a thumb and fingers to allow movement of the object.

12. The tab apparatus of claim 11, wherein the card grab tab has embossed braille letters, numbers or characters to assist users who are blind or have impaired vision.

13. The tab apparatus of claim 11, wherein the card grab tab has embossed sports equipment and team name features.

14. The tab apparatus of claim 11, wherein the card grab tab has embossed on it a person's face created from a photo or outline of a face from a photo of a family member, friend or other person.

15. The tab apparatus of claim 11, wherein the card grad tab has an oval shape on the distal end.

16. An apparatus, comprising:
a flexible card grab tab having at least one topographic embossed and raised feature on a proximal end;
wherein a user interface configured to allow a user to order a flexible card grab tab with at least one topographic embossed and raised feature including voice audio commands to attach a digital photo for creating at least one 3D printed topographic embossed and raised feature;
wherein the digital photo is converted into a 3D printing format using a scanner and computer processor for printing on a 3D printer the at least one topographic embossed and raised feature on the flexible card grab tab;
an adhesive applicator flap section located at a distal end of the flexible card grab tab;
a strip covering the adhesive applicator section, wherein the strip is configured to be removed by a user thereby exposing adhesive; and
wherein the adhesive is configured to be applied to an edge of a card by the user.

17. The apparatus of claim 16, wherein the card grab tab is configured as a filleted rectangular shape.

18. The apparatus of claim 16, wherein the card grab tab is configured as a semi-arched rectangle shape.

19. The apparatus of claim 16, wherein the card grab tab is configured as a shape including a bend with a predetermined angle in proximity to the adhesive area.

20. The apparatus of claim 16, wherein the card grab tab is configured as a shape formed into predetermined curvature beginning in proximity to the adhesive area extending to the tab tip and including curved embossed tab text conforming to the formed curvature.

\* \* \* \* \*